US012764393B2

(12) United States Patent
Bhattacharyya et al.

(10) Patent No.: US 12,764,393 B2
(45) Date of Patent: Oct. 13, 2026

(54) GENERATING VIDEO INSIGHTS BASED ON MACHINE-GENERATED TEXT REPRESENTATIONS OF VIDEOS

(71) Applicant: Adobe Inc., San Jose, CA (US)

(72) Inventors: Aanisha Bhattacharyya, Noida (IN); Yaman Kumar, New Delhi (IN)

(73) Assignee: Adobe Inc., San Jose, CA (US)

( * ) Notice: Subject to any disclaimer, the term of this patent is extended or adjusted under 35 U.S.C. 154(b) by 171 days.

(21) Appl. No.: 18/481,882

(22) Filed: Oct. 5, 2023

(65) Prior Publication Data

US 2025/0119625 A1 Apr. 10, 2025

(51) Int. Cl.
*H04N 21/84* (2011.01)
*G06F 40/56* (2020.01)
*G06V 10/764* (2022.01)

(52) U.S. Cl.
CPC ............. *H04N 21/84* (2013.01); *G06F 40/56* (2020.01); *G06V 10/764* (2022.01)

(58) Field of Classification Search
None
See application file for complete search history.

(56) References Cited

U.S. PATENT DOCUMENTS 12,063,123 B1 * 8/2024 Rivera-Rodriguez ........................ H04L 12/1831
2022/0237228 A1 * 7/2022 Xu ........................ G06F 16/2474
2024/0403290 A1 * 12/2024 Hawes .............. G06F 16/24522

OTHER PUBLICATIONS

Zhao et al., “Text from Corners: A Novel Approach to Detect Text and Caption in Videos”, IEEE Transactions on Image Processing, vol. 20, No. 3, Mar. 2011 (Year: 2011).*
Bai, C., et al., “M2P2: Multimodal Persuasion Prediction using Adaptive Fusion”, IEEE Transactions on Multimedia, arXiv:2006.11405v2 [cs.CV] Dec. 11, 2021, pp. 1-12 (2021).
Brown, T, B., et al., “Language Models are Few-Shot Learners”, 34th Conference on Neural Information Processing Systems (NeurIPS 2020), Vancouver, Canada, pp. 1-25 (2020).
Chen, J., and Yang, D., “Weakly-Supervised Hierarchical Models for Predicting Persuasion Strategies in Good-faith Textual Requests”, Proceedings of the AAAI Conference on Artificial Intelligence, (14), pp. 12648-12656 (2020).
Chen, X., et al., “An Empirical Study of Training Self-Supervised Vision Transformers”, In Proceedings of the IEEE/CVF International Conference on Computer Vision, arXiv:2104.02057v4 [cs.CV] Aug. 16, 2021, pp. 1-10 (2021).
(Continued)

*Primary Examiner* — James R Marandi
(74) *Attorney, Agent, or Firm* — Shook, Hardy & Bacon L.L.P.

(57) ABSTRACT

Methods, computer systems, computer-storage media, and graphical user interfaces are provided for efficiently generating video insights based on text representations of videos. In embodiments, text data associated with a video is obtained. Thereafter, a model prompt to be input into a large language model is generated. The model prompt includes the text data associated with the video. As output from the large language model, a text representation that represents the video in natural language based on the text data is obtained. The text representation is provided as input into a machine learning model to generate a video insight that indicates context of the video.

10 Claims, 9 Drawing Sheets

(56) References Cited

OTHER PUBLICATIONS

Chung, H, W., et al., "Scaling Instruction-Finetuned Language Models", arXiv:2210.11416v5 [cs.LG] Dec. 6, 2022, pp. 1-54 (2022).
Fu, Y., et al., "Complexity-Based Prompting for Multi-Step Reasoning", arXivpreprintarXiv:2210.00720, pp. 1-14 (2022).
Gaikwad, B., et al., "Can a Pretrained Language Model Make Sense with Pretrained Neural Extractors? An Application to Multimodal Classification", De-Factify: Workshop on Multimodal Fact Checking and Hate Speech Detection, AAAI, pp. 1-9 (2022).
Gong, B., et al., "Diverse Sequential Subset Selection for Supervised Video Summarization", In Advances in Neural Information Processing Systems, vol. 27, Curran Associates, Inc, pp. 1-9 (2014).
Goyal, R., et al., "The "something something" video database for learning and evaluating visual common sense", In Proceedings of the IEEE international conference on computer vision, arXiv:1706.04261v2 [cs. CV], pp. 1-21 (2017).
Gygli, M., et al., "Video Summarization by Learning Submodular Mixtures of Objectives", In 2015 IEEE Conference on Computer Vision and Pattern Recognition (CVPR), pp. 3090-3098 (2015).
Habernal, I., and Gurevych, I., "What makes a convincing argument? empirical analysis and detecting attributes of convincingness in web argumentation", In Proceedings of the 2016 Conference on Empirical Methods in Natural Language Processing, pp. 1214-1223 (2016).
Hussain, Z., et al., "Automatic understanding of image and video advertisements", arXiv:1707.03067v1 [cs.CV] Jul. 10, 2017, pp. 1-11 (2017).
Joo, J., et al., "Visual persuasion: Inferring communicative intents of images", In Proceedings of the IEEE conference on computer vision and pattern recognition, pp. 1-8 (2014).
Kay, W., et al., "The Kinetics Human Action Video Dataset", arXivpreprint arXiv:1705.06950, pp. 1-22 (2017).
Kojima, T., et al., "Large Language Models are Zero-Shot Reasoners", arXivpreprintarXiv:2205.11916, pp. 1-42 (2022).
Krause, J., et al., "A Hierarchical Approach for Generating Descriptive Image Paragraphs", In Proceedings of the IEEE conference on computer vision and pattern recognition, pp. 1-27 (2017).
Krishna, R., et al., "Dense-captioning events in videos", In Proceedings of the IEEE international conference on computer vision, pp. 1-16 (2017).
Kumar, Y., et al., "Persuasion strategies in advertisements", Proceedings of the AAAI Conference on Artificial Intelligence, pp. 1-15 (2023).
Lewkowycz, A., et al., "Solving Quantitative Reasoning Problems with Language Models", arXivpreprint arXiv:2206.14858, pp. 1-54 (2022).
Li, J., et al., "Blip-2: Bootstrapping language-image pre-training with frozen image encoders and large language models", arXiv:2301.12597v3 [cs.CV], pp. 1-13 (2022).
Li, J., et al., "Video storytelling: Textual summaries for events", IEEE Transactions on Multimedia, 22(2):, pp. 1-11 (2020).
Liang, X., et al., "Recurrent Topic-Transition GAN for Visual Paragraph Generation", In Proceedings of the IEEE international conference on computer vision, pp. 3362-3371 (2017).
Liu, J., et al., "RAINIER: Reinforced Knowledge Introspector for Commonsense Question Answering", arXivpreprintarXiv:2210.03078, pp. 1-21 (2022).
Lu, Y., and Wu, X., "Video storytelling based on gated video memorability filtering", Electronics Letters, 58(15):, pp. 576-578 (2022).
Luu, K., et al., "Measuring Online Debaters' Persuasive Skill from Text over Time", Transactions of the Association for Computational Linguistics, 7:, pp. 537-550 (2019).
Min, S., et al., "Rethinking the role of demonstrations: What makes in-context learning work?", arXivpreprint arXiv:2202.12837, pp. 1-19 (2022).
Mogadala, A., et al., "Trends in Integration of Vision and Language Research: A Survey of Tasks, Datasets, and Methods", Journal of Artificial Intelligence Research, 71:, pp. 1183-1317 (2021).
Pilli, S., et al., "Predicting Sentiments in Image Advertisements using Semantic Relations among Sentiment Labels", In Proceedings of the IEEE/CVF Conference on Computer Vision and Pattern Recognition Workshops, pp. 1-9 (2020).
Plutchik, R., "Chapter 1—A General Psychoevolutionary Theory of Emotion", In Robert Plutchik and Henry Kellerman, editors, Theories of Emotion, Academic Press, pp. 3-33 (1980).
Savchenko, A., et al., "Ad lingua: Text classification improves symbolism prediction in image advertisements", In Proceedings of the 28th International Conference on Computational Linguistics, pp. 1886-1892 (2020).
Socher, R., and Fei-Fei, L., "Connecting Modalities: Semi-supervised Segmentation and Annotation of Images Using Unaligned Text Corpora", In 2010 IEEE Computer Society Conference on Computer Vision and Pattern Recognition, pp. 966-973 (2010).
Tong, Z., et al., "VideoMAE: Masked Autoencoders are Data-Efficient Learners for Self-Supervised Video Pre-Training", 36th Conference on Neural Information Processing Systems (NeurIPS 2022), pp. 1-16 (2022).
Venugopalan, S., et al., "Sequence to Sequence—Video to Text", IEEE Xplore, cvf.com, pp. 4534-4542 (2015).
Vrandečic, D., and Krötzsch, M., "Wikidata: A Free Collaborative Knowledgebase", Communications of the ACM, 57(10):, pp. 78-85 (2014).
Wang, J., et al., "Improving OCR-based Image Captioning by Incorporating Geometrical Relationship", In 2021 IEEE/CVF Conference on Computer Vision and Pattern Recognition (CVPR), pp. 1306-1315 (2021).
Wang, S., et al., "GPT-NER: Named Entity Recognition via Large Language Models", arXiv:2304.10428v4 [cs.CL], pp. 1-21 (2023).
Wei, J., et al., "Chain-of-Thought Prompting Elicits Reasoning in Large Language Models", arXivpreprintarXiv:2201.11903, pp. 1-14 (2022).
Xu, H., et al., "VideoCLIP: Contrastive Pre-training for Zero-shot Video-Text Understanding", arXivpreprint arXiv:2109.14084, pp. 1-14 (2021).
Xu, K., et al., "Show, Attend and Tell: Neural Image Caption Generation with Visual Attention", In International conference on machine learning, PMLR, pp. 1-10 (2015).
Xu, R., et al., "Jointly Modeling Deep Video and Compositional Text to Bridge Vision and Language in a Unified Framework", In Proceedings of the Twenty-Ninth AAAI Conference on Artificial Intelligence, AAAI'15, AAAI Press, pp. 1-7 (2015).
Ye, K., and Kovashka, A., "Advise: Symbolism and External Knowledge for Decoding Advertisements", In Proceedings of the European Conference on Computer Vision (ECCV), pp. 1-19 (2018).
Ye, K., et al., "Interpreting the Rhetoric of Visual Advertisements", IEEE transactions on pattern analysis and machine intelligence, 43(4):, pp. 1-16 (2019).
Yu, H., et al., "Video Paragraph Captioning Using Hierarchical Recurrent Neural Networks", In Proceedings of the IEEE conference on computer vision and pattern recognition, pp. 4584-4593 (2016).
Yu, L., et al., "Hierarchically-Attentive RNN for Album Summarization and Storytelling", arXiv:1708.02977v1 [cs.CL], pp. 1-7 (2017).
Zhang, K., et al., "Video Summarization with Long Short-term Memory", arXiv:1605.08110v2 [cs.CV], pp. 1-24 (2016).
Zhang, M., et al., "Equal but not the same: Understanding the implicit relationship between persuasive images and text", arXivpreprintarXiv:1807.08205, pp. 1-14 (2018).
Zhang, Z., et al., "Automatic Chain of Thought Prompting in Large Language Models", arXivpreprintarXiv:2210.03493, pp. 1-25 (2022).
Zhou, D., et al., "Least-To-Most Prompting Enables Complex Reasoning in Large Language Models", arXivpreprintarXiv:2205.10625, pp. 1-61 (2022).
Chiang, Wei-Lin, et al. "Vicuna: An open-source chatbot impressing gpt-4 with 90%* chatgpt quality." See https://vicuna. Imsys. org (accessed Apr. 14, 2023), pp. 1-11 (2023).

* cited by examiner

402

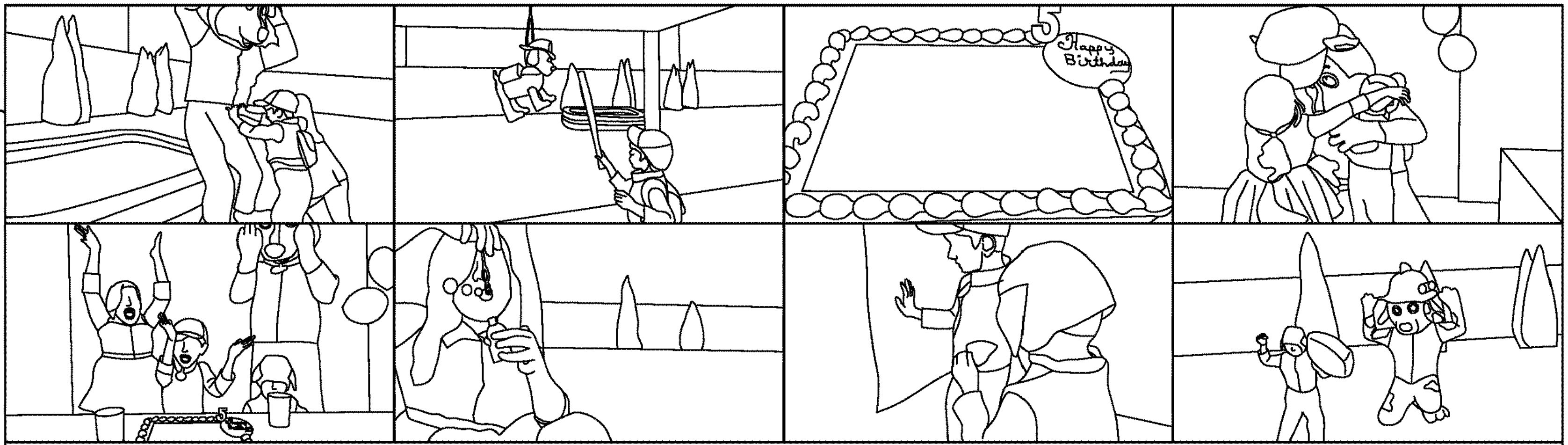

404 Transcript: well hey Zuma that's the wrong pinata .... how old are you .... my birthday cake is its zoo .... paw patrol you .... got as a present ... Thank You Marshall .... are you ready to blow out the candle .... Marshall let's push chase and the pool .... Wow all the surprises we got .... Go first okay put on the blindfold ready ...... for more fun click the red subscribe button 406 Text Representation : A family had the perfect idea for a Paw Patrol-themed birthday party. The kids had a blast blowing bubbles in the backyard and playing in the pool with a mascot in a Paw Patrol costume. The birthday boy got to play with a pinata in the backyard and a hot air balloon flew over the house. The kids played with toy bike and a Paw Patrol playhouse, and the birthday girl hugged a mascot. They also set up a LEGO train set and a DC Comics mascot in the pool. The birthday party ended with a game of catch and a pin the badge on the mascot game. Everyone had a great time, and the birthday cake was a Paw Patrol-themed delight. The vlog shows that family fun can be had at any birthday party with a little imagination.

| | | |
|---|---|---|
| **Topic** : Celebrations | **Emotion** : Cheerful | **Persuasion Strategy** : Social Identity, Social Proof |

408

| | |
|---|---|
| **Action** : Consider using your imagination to create a fun and memorable birthday party for your family or friends. | **Reason** : The reason is to create a uniquely fun-filled and memorable birthday party for your family or friends |

FIG. 4

GENERATING VIDEO INSIGHTS BASED ON MACHINE-GENERATED TEXT REPRESENTATIONS OF VIDEOS

BACKGROUND

Oftentimes, videos, such as movies, documentaries, advertisements, and user-generated content, depict some form of a story. Understanding various aspects or context associated with a video can be beneficial for a viewer, or potential viewer of the video, as well as for performing analysis on the video. Manually generating annotations or context for association with a video, however, is time consuming and resource intensive, as the video must be accessed and viewed as well as analyzed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things, facilitating efficient generation of video insights for a video based on a text representation of the video. In this regard, video insights are efficiently and effectively generated in an automated manner such that the video insights can be viewed, analyzed, used as tags for the video, etc. Such video insights generally convey contextual information associated with the video, such as an emotion, a persuasion strategy, a topic, an action, a reason, and/or the like.

To efficiently generate video insights, a text representation that represents the video using a natural language description is generated using a large language model. In embodiments, the text representation is generated using text associated with different modalities of the video. As one example, text corresponding to the video audio and text corresponding to an image(s) in the video are used to generate the text representation via the large language model. The generated text representation is then used to as input to generate one or more video insights. For example, the text representation is input into a classifier, a generator, and/or a LLM to obtain one or more video insights indicating context of the video. Generating a video insight in an automated manner reduces computing resources utilized to manually review a video. For example, a video does not need to be downloaded and viewed to identify particular information about the video in order to manually generating annotations for the video. As another example, computing resources used to manually locate, view, and synthesize a video are not needed.

BRIEF DESCRIPTION OF THE DRAWINGS

The technology described herein is described in detail below with reference to the attached drawing figures, wherein:

FIG. 4 provide an example of a text representation and video insights generated for a video, in accordance with embodiments of the present technology;

DETAILED DESCRIPTION

Figure 1:
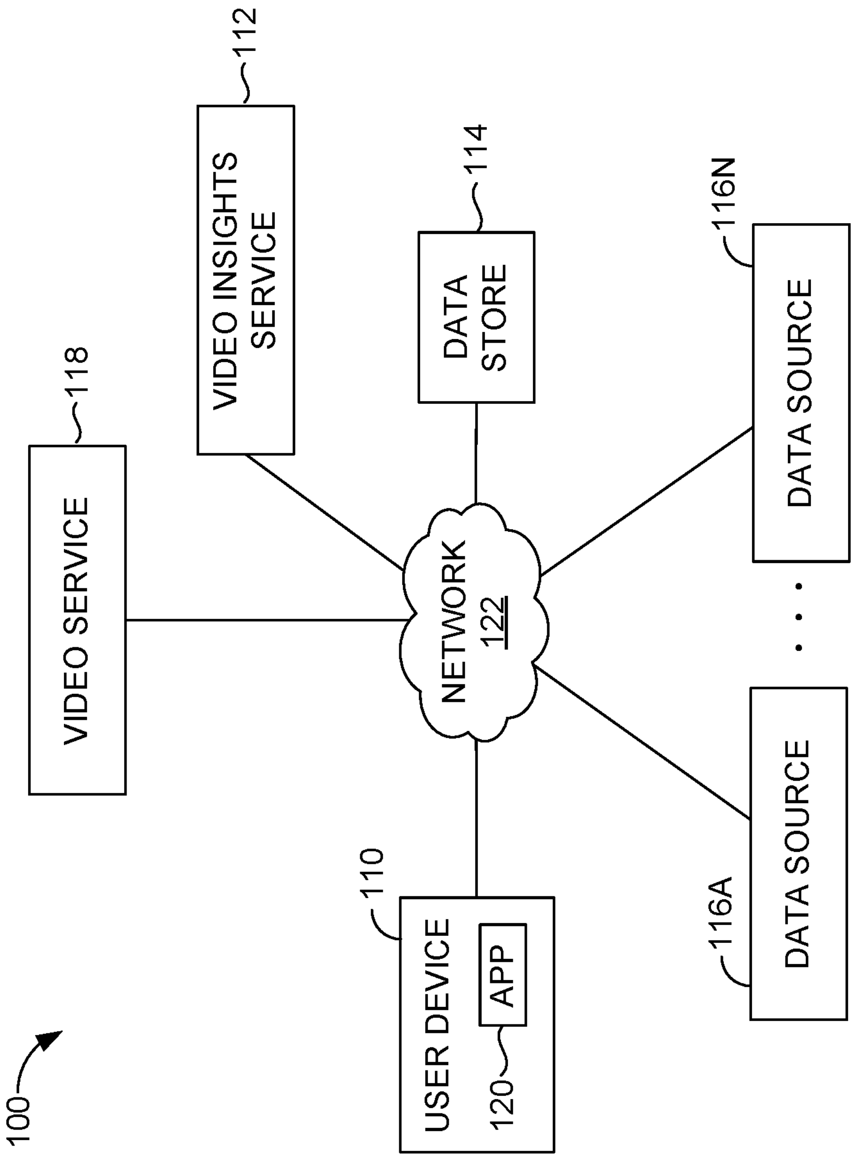
FIG. 1 is a block diagram of an exemplary system for facilitating efficient generation of video insights based on text representations, suitable for use in implementing aspects of the technology described herein.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Overview

Generally, videos, such as movies, documentaries, advertisements, and user-generated content, depict some form of a story. In particular, videos generally use text, scenery, audio, and story (time-series) elements and employ rhetorical devices, such as emotions, symbolism, and slogans to convey meaning. Accordingly, reasoning over sequences of images and audio that depict events as they occur and change is valuable over single activity and static moments. Such analysis performed manually is tedious and error prone. In an effort to perform such video analysis in an automated manner, machine learning may be employed. However, there is an absence of annotated training datasets, thereby preventing training supervised learning models that can obtain an acceptable performance. Moreover, training models which require human supervision is expensive, particularly given the number of human annotations needed to achieve models with usable performance. In addition to the time consumed to manually annotate videos, or portions associated therewith, computing resources are unnecessarily consumed.

Further, using machine learning on video reasoning tasks is challenging. For example, a video in raw form can be long, spanning minutes and longer and, thus containing, an extensive amount of frames. Directly encoding all the frames via pre-trained models could be computationally intractable and result in huge amounts of irrelevant information, thereby unnecessarily utilizing computing resources. Further, for effective video understanding, information corresponding with multiple sources and modalities is valuable. For instance, dialogue, text, characters, and scenes provide both intersecting and mutually exclusive information helpful to understand and reason about a video.

Accordingly, embodiments of the present technology are directed to efficient and effective generation of video insights for a video based on a text representation of the video. In this regard, video insights are efficiently and effectively generated in an automated manner such that the video insights can be viewed, analyzed, used as tags for the video, etc. Generally, as described herein, video insights convey contextual information associated with the video. A video insight can represent or indicate an emotion, a persuasion strategy, a topic, an action, a reason, and/or the like. Generating a video insight in an automated manner reduces computing resources utilized to manually review a video. For example, a video does not need to be downloaded and viewed to identify particular information about the video in order to manually generating annotations for the video. As another example, computing resources used to manually locate, view, and synthesize a video are not needed. For instance, assume a user is interested in a video. Using embodiments described herein, a text representation and/or video insights can be provided in association with the video, such that the user does not need to view any or all of the video. In this way, a potential consumer is presented with context or semantics associated with a video, thereby reducing the additional computing resources consumed with a user otherwise searching for such information (e.g., by viewing the video or performing a search).

In operation, to efficiently and effectively generate video insights, a text representation is generated and used. A text representation generally refers to a representation, in the form of text, of a video. As described in association with embodiments described herein, a machine learning model, which may be in the form of a LLM, is used to generate a text representation of a video in an automated manner. As such, the text representation generated via machine learning model can decompose a long video into a short story. Thereafter, the generated text representation can be used to reason about the video using the text representation instead of the raw information. In this way, the relevant aspects are retained, while irrelevant aspects are excluded from interfering with the analysis. In this way, videos having a multimodal domain are converted to small coherent textual stories by verbalizing video frames (e.g., keyframes), audio, and/or text-overlaid in scenes. As such, highly-multimodal videos are represented in text, via a LLM, while being informed through different modalities, such as audio, raw pixels of frames, text overlaid on scenes, emotions, and product and business information. The generated text representation (as opposed to using the original video) can then be used to perform story-understanding tasks to generate video insights.

In this regard, aspects of the technology described herein facilitate generating a model prompt to input into a LLM to attain a desired output in the form of a text representation. For example, for a particular video, a model prompt is programmatically generated and used to facilitate output in the form of a text representation. The model prompt may be based on various text data (e.g., corresponding with different aspects or modalities of the video) associated with the particular video, which can be obtained and/or selected for generating the model prompt. Using technology described herein, a text representation can be generated to be concise and provide a cohesive narrative of vents through time in a natural language manner. The text representation can, thereafter, be used to reason about complex cognitive tasks, such as emotions depicted and persuasion strategies used, among other things.

Advantageously, using a LLM to generate text summaries and/or video insights facilitates reducing computing resource consumption, such as computer memory and latency. In particular, text summaries and/or video insights can be accurately generated without requiring training and/or fine-tuning of the model. Utilizing pre-trained models reduces computing resources consumed for performing training. Fine-tuning refers to the process of re-training a pre-trained model on a new dataset without training from scratch. Fine-tuning typically takes weights of a trained model and uses those weights as the initialization value, which is then adjusted during fine-tuning based on the new dataset. Particular embodiments described herein do not need to engage in fine-tuning by ingesting millions of additional data sources and billions of parameters and hyperparameters. As such, the models of various embodiments described herein are significantly more condensed. In accordance with embodiments described herein, the models do not require as much computational and memory requirements because there is no need to access the billions of parameters, hyperparameters, or additional resources in the fine-tuning phase. As described, all of these parameters and resources must typically be stored in memory and analyzed at runtime and fine-tuning to make predictions, making the overhead extensive and unnecessary.

Further, various embodiments take significantly less quantity of time to train and deploy in a production environment because the various embodiments can utilize a pre-trained model that does not require fine-tuning. Accordingly, one technical solution is that embodiments can utilize pre-trained models without requiring fine-tuning. Another technical solution is utilizing the text data as an input prompt for the machine learning model as a proxy to fine-tuning. Further, human-annotated samples are not needed for training, fine-tuning, or including in a model prompt to generate a text representation. As such, embodiments described herein improve computing resource consumption, such as computer memory and latency at least because not as much data (e.g., parameters) is stored or used for producing the model output and computational requirements otherwise needed for fine-tuning are not needed.

Various terms or phrases are used herein to describe various aspects of the technology. Although generally described in further detail herein, below is a brief description of some of these terms or phrases:

A text representation generally refers to a representation of a video in the form of text. A text representation can provide a summary (e.g., concise summary, such as a paragraph) or characterization of a video in a natural language manner to convey different aspects the video. In this regard, a text representation can provide a cohesive narrative of events through time (as the sequences of images and audio that depict events occur). The text representation can be generated based on different types of text corresponding with different modalities. For example, text data can be generated based on the audio of the video and text data can be generated based on analysis of images in the video. Such text data enables a comprehensive text representation to be generated (e.g., via a large language model).

A video insight refers to an insight that provides context or information associated with the video. As described herein, video insights are generated in an automated manner, and not a human annotation. The video insights can be presented, used for analysis of the video, used to tag or label the video, among other things. Various video insights include insights related to emotions, persuasion strategies, topics, actions, and/or reasons, thereby providing context associated with the video.

Overview of Exemplary Environments for Generating Video Insights Based on Machine-Generated Text Representations of Videos Referring initially to FIG. 1, a block diagram of an exemplary network environment 100 suitable for use in implementing embodiments described herein is shown. Generally, the system 100 illustrates an environment suitable for facilitating generation of video insights based on machine-generated text representations of videos. Among other things, embodiments described herein efficiently generate machine-generated text representations of videos and, thereafter, using such text representations to efficiently generate video insights. Generally, a machine-generated text representation refers to a text representation of a video generated, for example, via a large language model. The text representation, which may also be referred to as a text story, can represent the video in way that provides a natural language story of the video. A video insight generally refers to an insight associated with or related to a video. By way of example only, a video insight may relate to an emotion, a persuasion strategy, a topic, an action, or a reason, as described more fully herein. Advantageously, generating and providing a text representation of a video and/or video insight in an efficient manner enables a user interested in a video to have a better understanding of the video without having to manually track down the desired data using various systems and queries thereto and/or utilize resources to view the video.

The network environment 100 includes user device 110, a video insights service 112, a data store 114, data sources 116*a*-116*n* (referred to generally as data source(s) 116), and a video service 118. The user device 110, the video insights service 112, the data store 114, the data sources 116*a*-116*n*, and video service 118 can communicate through a network 122, which may include any number of networks such as, for example, a local area network (LAN), a wide area network (WAN), the Internet, a cellular network, a peer-to-peer (P2P) network, a mobile network, or a combination of networks.

The network environment 100 shown in FIG. 1 is an example of one suitable network environment and is not intended to suggest any limitation as to the scope of use or functionality of embodiments disclosed throughout this document. Neither should the exemplary network environment 100 be interpreted as having any dependency or requirement related to any single component or combination of components illustrated therein. For example, the user device 110 and data sources 116*a*-116*n* may be in communication with the video insights service 112 and/or the video service 118 via a mobile network or the Internet, and the video insights service 112 and/or video service 118 may be in communication with data store 114 via a local area network. Further, although the environment 100 is illustrated with a network, one or more of the components may directly communicate with one another, for example, via HDMI (high-definition multimedia interface), and DVI (digital visual interface). Alternatively, one or more components may be integrated with one another. For example, at least a portion of the video insights service 112 and/or data store 114 may be integrated with the user device 110, data sources 116, and/or video service 118. For instance, a portion of the video insights service 112 may be integrated with a user device, while another portion of the video insights service 112 may be integrated with a video service 118.

The user device 110 can be any kind of computing device capable of facilitating generating and/or providing text representations and/or video insights. For example, in an embodiment, the user device 110 can be a computing device such as computing device 900, as described above with reference to FIG. 9. In embodiments, the user device 110 can be a personal computer (PC), a laptop computer, a workstation, a mobile computing device, a PDA, a cell phone, or the like.

The user device can include one or more processors, and one or more computer-readable media. The computer-readable media may include computer-readable instructions executable by the one or more processors. The instructions may be embodied by one or more applications, such as application 120 shown in FIG. 1. The application(s) may generally be any application capable of facilitating generating and/or providing text representations and/or video insights. In some implementations, the application(s) comprises a web application, which can run in a web browser, and could be hosted at least partially server-side (e.g., via a server). In addition, or instead, the application(s) can comprise a dedicated application. In some cases, the application is integrated into the operating system (e.g., as a service).

User device 110 can be a client device on a client-side of operating environment 100, while video insights service 112 and/or video service 118 can be on a server-side of operating environment 100. Video insights service 112 and/or video service 118 may comprise server-side software designed to work in conjunction with client-side software on user device 110 so as to implement any combination of the features and functionalities discussed in the present disclosure. An example of such client-side software is application 120 on user device 110. This division of operating environment 100 is provided to illustrate one example of a suitable environment, and it is noted there is no requirement for each implementation that any combination of user device 110, video insights service 112, and/or video service 118 to remain as separate entities.

In an embodiment, the user device 110 is separate and distinct from the video insights service 112, the data store 114, the data sources 116, and the video service 118 illustrated in FIG. 1. In another embodiment, the user device 110 is integrated with one or more illustrated components. For instance, the user device 110 may incorporate functionality described in relation to the video insights service 112 and/or video service 118. For clarity of explanation, embodiments are described herein in which the user device 110, the video insights service 112, the data store 114, the data sources 116, and the video service 118 are separate, while understanding that this may not be the case in various configurations contemplated.

As described, a user device, such as user device 110, can facilitate generating and/or providing text representations and/or video insights. A user device 110, as described herein, is generally operated by an individual or entity that may initiate generation and/or that views text representation(s)

and/or video insight(s). In some cases, such an individual may be, or be associated with, a contributor, manager, developer, or creator of a video (e.g., a video being analyzed to generate the text representation and/or video insight). In this regard, the user may be interested in text representations and/or video insights, for example, to understand how to enhance or improve the video, to understand how to market or advertise the video, etc. In other cases, an individual or entity operating the user device may be an individual associated with a video service, that is, a service that facilitates generation and/or presentation of videos (e.g., a search engine that provides videos as search results, a video storage service, etc.). For example, a user may be interested in text representations and/or video insights to provide better or more relevant search results. In yet other cases, such an individual may be a person interested in or a consumer of a video. For example, an individual may navigate to view a video (e.g., included as a search result). Based on navigating to view a video, and/or searching for a particular video, the user may be provided with a text representation and/or a video insight(s) for the particular video. In this way, the viewer of the video may be presented with additional context or insights related to the video that can be valuable to the viewer. Alternatively or additionally, the user may not need to view the video based on the presentation of the text representation and/or video insight(s).

In some cases, generation or provision of text representations and/or video insights may be initiated at the user device 110. For example, in some cases, a user may directly or expressly select to generate or view a text representation and/or video insight(s) related to a video. For instance, a user desiring to view insights associated with a video may specify a desire to view a video insight. To this end, a user of the user device 110 that initiates generating and/or providing of a text representation or video insight(s) may be a user that performs some aspect of video development, marketing, or the like (e.g., via a link or query). As another example, a user desiring to view a video may select a link or icon to view a text representation and/or video insight associated with the video. In other cases, a user may indirectly or implicitly select to generate or view a text representation and/or video insight(s) related to a video. For instance, a user may navigate to a media store application or website. Based on the navigation to the media store application or website, the user may indirectly indicate to generate or view a text representation and/or video insight. In some cases, such an indication may be based on generally navigating to the application or website. For instance, a text representation and/or video insight may be requested for each video to be presented in the application or website (e.g., advertisements, search results, etc.). In other cases, such an indication may be based on selecting a particular video to view or hovering over a particular video to indicate interest. In yet another example, a user of the user device 110 that initiates generating and/or providing of a text representation and/or video insight(s) may be a user corresponding with a video service. For instance, a video service that hosts various videos (e.g., for presenting or storing) may desire to generate text representations and/or video insights for a set of videos. In this way, the user may select one video or a batch of videos and, thereafter, select to generate a text representation and/or video insight(s) associated with the selected video(s). In other embodiments, initiation of text representations and/or video insights may be automatically triggered or initiated. For instance, upon a video service obtaining a particular number of new videos, generation of video insights associated with the new videos can be automatically triggered.

Generating and/or providing a text representation and/or video insights may be initiated and/or presented via an application 120 operating on the user device 110. In this regard, the user device 110, via an application 120, might allow a user to initiate generation or presentation of a text representation(s) and/or video insight(s). The user device 110 can include any type of application and may be a stand-alone application, a mobile application, a web application, or the like. In some cases, the functionality described herein may be integrated directly with an application or may be an add-on, or plug-in, to an application. One example of an application that may be used to initiate and/or present text representation(s) and/or video insight(s) include any application in communication with a video service, such as video service 118.

Video service 118 may be any service that provides, stores, and/or presents videos. By way of example, a video service may include a video store, a media store, a search engine, a video search engine, a video data store, an advertisement or marketing service, or the like. In some of these examples, the video service provides a video (e.g., for viewing or consumption) and can include text representations and/or video insights associated with the video. For example, a video service may be or include a video search results service that provides various videos for viewing. An individual may select to view, purchase, or obtain a video or set of videos. In the video offering, the video service includes or provides a corresponding text representation and/or video insight(s), such that the video, or aspects of the video, can be used to understand the video. In some cases, in addition to or in the alternative to presenting or displaying a text representation(s) and/or video insight(s), such information may be used for performing analysis of a video or a set of videos or for performing a search using the information, etc.

Although embodiments described above generally include a user or individual inputting or selecting (either expressly or implicitly) to initiate or view a text representation and/or video insight, as described below, such initiation may occur in connection with a video service, such as video service 118, or other service or server. For example, video service 118 may initiate generation of text representations and/or video insights on a periodic basis. Such video information can then be stored and, thereafter, accessed by the video service 118 to provide to a user device for viewing (e.g., based on a user navigating to a particular video, for instance, in a video store, a video search, etc.).

The user device 110 can communicate with the video insights service 112 and/or video service 118 to initiate generation or viewing of a text summary(s) and/or video insight. In embodiments, for example, a user may utilize the user device 110 to initiate generation of video insights via the network 122. For instance, in some embodiments, the network 122 might be the Internet, and the user device 110 interacts with the video insights service 112 (e.g., directly or via another service such as the video service 118) to initiate generation of video insights. In other embodiments, for example, the network 122 might be an enterprise network associated with an organization. It should be apparent to those having skill in the relevant arts that any number of other implementation scenarios may be possible as well.

With continued reference to FIG. 1, the video insights service 112 can be implemented as server systems, program modules, virtual machines, components of a server or servers, networks, and the like. At a high level, the video insights service 112 manages generation of text representations and video insights associated with videos. In particular, the video insights service 112 can obtain or generate various text data associated with a video, such as video metadata, a video transcription, video descriptions, video captions, video objects, and/or the like. Using the text data associated with a video, the video insights service 112 can generate a model prompt to initiate generation of a text representation of the video. As one example, a model prompt may include various text data associated with a video. The model prompt can be input into a LLM to obtain, as output, a text representation of the video. In some cases, text data used as a basis for generating a text representation may correspond with data provided via data sources 116. Data sources 116*a*-116*n* may be any type of computing devices at which data used as or to generate text data may be provided or stored. For example, upon an individual creating or producing a video via a data source 116, the individual may provide the video for use, searching, viewing, and/or analysis. The video provided may be provided by the data source 116 (e.g., to the video service 118 that collects videos), for example, for subsequent presentation to potential consumers.

In some embodiments, the video insights service 112 preprocesses text data such that the text data included in the model prompt is more effective in generating a desired output. For example, various text data may be filtered out or removed based on duplication of data, date of data, and/or the like.

In accordance with generating a text representation, the video insights service 112 outputs the text representation of a video. In some cases, the video insights service 112 outputs a text representation(s) to user device 110. For example, assume a user is viewing, or desires to view, a particular video or video clip via application 120 operating on user device 110. In such a case, a text representation associated with the particular video may be provided to the user device 110. In other cases, the video insights service 112 outputs a text representation(s) to another service, such as video service 118, or a data store, such as data store 114. For example, upon generating a text representation, the text representation can be provided to video service 118 and/or data store 114 for subsequent use. For instance, when a user subsequently views a particular video via application 120 on user device 110, the video service 118 may provide a text representation associated with the video to the user device.

In embodiments, the video insights service 112 can additionally or alternatively use the generated text representation to generate one or more video insights. In this regard, the text representation can be provided as input to a component(s) that generates a video insight(s). Various implementations may be used to generate video insights, some of which are described in more detail below. As one example, an LLM may be used to generate video insights based on the text representation. As another example, a classifier or set of classifiers may be used to generate video insights.

As with the text representation, the video insights service 112 can output the video insights associated with a video. In some cases, the video insights service 112 outputs a video insight(s) to user device 110. For example, assume a user is viewing, or is interested in, a particular video or video clip via application 120 operating on user device 110. In such a case, a video insight(s) associated with the particular video may be provided to the user device 110. In other cases, the video insights service 112 outputs a video insight(s) to another service, such as video service 118, or a data store, such as data store 114. For example, upon generating a video insight(s), the video insight(s) can be provided to video service 118 and/or data store 114 for subsequent use. For instance, when a user subsequently views a particular video via application 120 on user device 110, the video service 118 may provide a video insight associated with the video to the user device. In yet other cases, a video insight(s) may be provided for analysis of the video or a set of videos. Any number of uses of such video insights may be implemented in accordance with embodiments described herein.

As described, the video service 118 may be any service that provides, presents, or analyzes videos. By way of example, a video service may include a video store, a media store, a video search service, a video datastore, a video analysis service, a video creation service, or the like. In these examples, the video service can provide a video and/or text representation/video insight(s) associated with the video. For example, a video service may be or include an e-commerce service that provides various videos for viewing. In this regard, the video service 118 may communicate with user device 110, for example, via application 120, to present various videos, text representations, and/or video insights for display. For instance, video service 118 may communicate with application 120 operating on user device 110 to provide back-end services to application 120.

As can be appreciated, in some cases, the video insights service 112 may be a part of, or integrated with, the video service 118. In this regard, the video insights service 112 may function as portion of the video service 118. In other cases, the video insights service 112 may independent of, and separate from, the video service 118. Any number of configurations may be used to implement aspects of embodiments described herein.

Advantageously, utilizing implementations described herein enable generation and presentation of text representations and/or video insights to be performed in an efficient manner. Further, the generated text representations provide a story inclusive of multiple modes associated with a video, such that various aspects of a video can be analyzed and used to generate video insights. As such, more relevant information, and not an entire original video, can be used to generate video insights, thereby facilitating more effective video insights.

Figure 2:
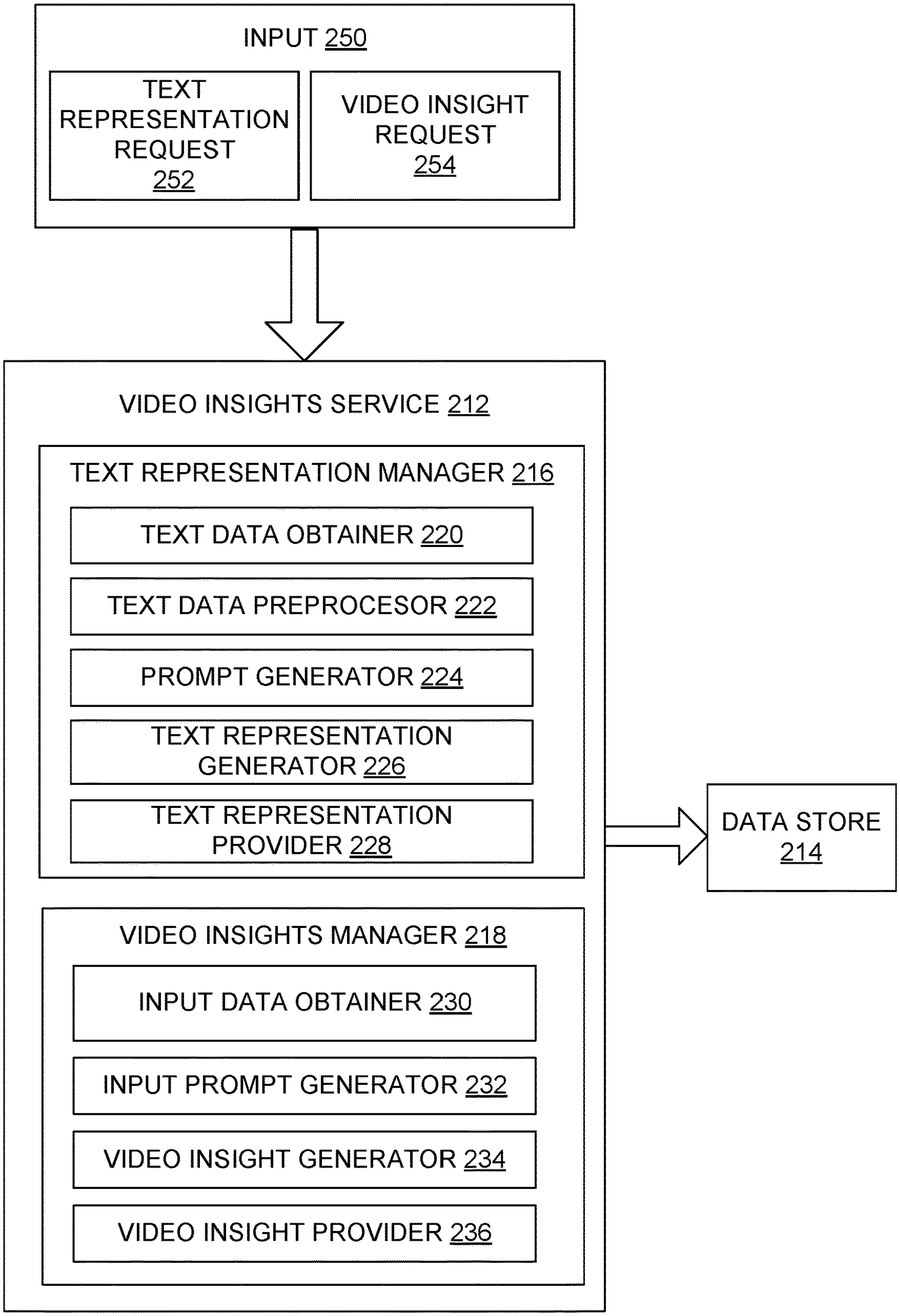
FIG. 2 is an example implementation for facilitating efficient generation of video insights based on text representations, in accordance with aspects of the technology described herein.

Turning now to FIG. 2, FIG. 2 illustrates an example implementation for generating and/or providing text representations and/or video insights, via video insight service 212. The video insight service 212 can communicate with the data store 214. The data store 214 is configured to store various types of information accessible by the video insight service 212 or other server or service. In embodiments, user devices (such as user devices 110 of FIG. 1), data sources (such as data sources 116 of FIG. 1), a video service (such as video service 118 of FIG. 1), and/or servers or services can provide data to the data store 214 for storage, which may be retrieved or referenced by any such component. As such, the data store 214 may store videos, text data (e.g., metadata, descriptions, captions, etc.), text representations, video insights, and/or the like. In this regard, data store 214 may store generated text representations and/or video insights, which can then be accessed for subsequent use, analysis, or display.

In operation, the video insights service 212 is generally configured to manage generation and/or provision of text representations and/or video insights. In embodiments, the video insights service 212 includes a text representation manager 216 and a video insights manager 218. The text representation manager 216 is generally configured to manage generation of text representations, and the video insights manager 218 is generally configured to manage generation of video insights. According to embodiments described herein, the video insights service 212 can include any number of other components not illustrated. In some embodiments, one or more of the illustrated components 216 and 218 can be integrated into a single component or can be divided into a number of different components. Components 216 and 218 can be implemented on any number of machines and can be integrated, as desired, with any number of other functionalities or services.

In embodiments, the text representation manager 216 includes a text data obtainer 220, a text data preprocessor 222, a prompt generator 224, a text representation generator 226, and a text representation provider 228. According to embodiments described herein, the text representation manager 216 can include any number of other components not illustrated. In some embodiments, one or more of the illustrated components 220, 222, 224, 226, and 228 can be integrated into a single component or can be divided into a number of different components. Components 220, 222, 224, 226, and 228 can be implemented on any number of machines and can be integrated, as desired, with any number of other functionalities or services.

As described, the text representation manager 216 is generally configured to generate and/or provide text representations. A text representation generally provides a representation of a video in the form of text. In this way, various modes or aspect of a video can be represented in a single text story. In embodiments, the text representation is a machine-generated text representation based on various text data associated with a video.

The text representation manager 216 may receive input 250 to initiate generation and/or provision of a text representation(s). Input 250 may include a text representation request 252. A text representation request 252 generally includes a request or indication to generate a text representation associated with a video. A text representation request may specify, for example, an indication of a video for which a text representation and/or video insight is desired, an indication of a set of text data to use for generating a text representation and/or video insight, an indication of a user to which the text representation and/or video insight(s) is to be presented, an indication of a type of video insight desired to be generated, and/or the like.

A text representation request 252 may be provided by any service or device. For example, in some cases, a text representation request 252 may be initiated and communicated via a user device, such as user device 110 of FIG. 1. For example, assume a user accesses a website or an application having one or more videos associated therewith (e.g., presented via the website or application). In such a case, a text representation request 252 may be initiated that includes a request to generate text representation associated with a video. For instance, in one example, the text representation request 252 may specify each video associated with the website or application. In another example, the text representation request 252 may specify a particular set of videos for which a text representation and/or video insight(s) is desired, such as the videos initially presented via the application or website, or a video selected or otherwise identified in association with a user interest (e.g., a user pauses scrolling over the video or selecting the video). In another example, a user may be an individual or entity associated with a particular set of videos (e.g., a creator of videos). In such a case, the user may select to view text representations and/or video insights associated with the particular video(s) such that the user can obtain constructive insights related to the video. In this way, the user may view the text representation and/or video insights to identify opportunities to improve or enhance the video.

Alternatively or additionally, a text representation request 252 may be initiated and communicated via a user device or administrator device, such administrator device associated with video service 118 of FIG. 1. For example, assume a video service 118 provides a website that enables presentation of various videos. An administrator of the website may initiate a text representation request 252 to generate text representations associated with such videos. Such video data may be stored for later presentation to users. In other cases, a text representation request 252 may be automatically initiated and communicated via a service, such as video service 118 of FIG. 1. For example, a website or application service, such as video service 118, associated with a video may automatically initiate generation of text representations and/or video insights, for instance, based on a lapse of a time period, a reception of a set of videos (e.g., upon obtaining a predetermined number of videos), or other criteria. As can be appreciated, the automated initiation of text representation generation and/or video insight generation may be dynamic, for instance, based on attributes associated with the video. For example, in cases in which videos are more frequently obtained or viewed, a request may be initiated more frequently, whereas when videos are less frequently obtained or reviewed, the request for text representation generation and/or video insight generation may be initiated less frequently.

As described herein, although text representation request 252 and video insight request 254 are illustrated separately, in embodiments, a single request may be used. Further, although not illustrated, input 250 may include other information communicated in association with a request, such as text representation request 252. For example, and as described below as one implementation, a video, or a reference thereto (e.g., a link to a video), a desired type of video insight, etc., may be provided in association with the request. For instance, in some cases, an administrator may provide an indication of a video and a set of text data, which is communicated in association with a request to initiate generation of text representation and/or video insight(s).

The text data obtainer 220 is generally configured to obtain text data. In this regard, in some cases, the text data obtainer 220 obtains text data in accordance with obtaining a request, such as text representation request 252. Text data generally refers to any data in the form of text that is associated with a video and/or used to generate a text representation of the video. In this regard, text data may include, but is not limited to, video metadata, a video transcription, video descriptions, video captions, video objects, and/or the like. Video metadata refers to metadata associated with a video. Video metadata may include various information, such as, for example, a video name or title, a company name, business information, a video provider (e.g., a YouTube® Channel name), a date of video, etc. A video transcription refers to a transcription or text generated that corresponds with the audio of the video. Stated differently, a video transcription refers to a text version of the spoken parts of a video (e.g., a closed caption script). A video description refers to a text description of the video. A video caption refers to a caption or descriptor of the video (e.g., image as a whole). A video object refers to an indication of an object in the video.

In some cases, the text data obtainer 220 can obtain text data from various sources for utilization in determining text representations. As described above, in some cases, text data may be obtained as input 250 along with the text representation request 252. For example, in some implementations, a user (e.g., an administrator) may input or select text data (e.g., a text transcription), or a portion thereof, via a graphical user interface for use in generating text representations. For instance, a user, operating via a user device, desiring to view a text representation and/or video insight may select or input a set of text data associated with a video for use in generating corresponding text representation and/or video insight.

Additionally or alternatively, the text data obtainer 220 may obtain text data from any number of sources, such as data sources 116 of FIG. 1, or data stores, such as data store 214. In this regard, in accordance with initiating generation of a text representation of video insight, the text data obtainer 220 may communicate with a data store(s) or other data source(s), including a video service (e.g., video service 118 of FIG. 1) and obtain text data to generate a text representation(s). For example, in accordance with an indication or specification of a video, text data associated with the particular video can be accessed and obtained. Such text data that may be obtained includes, for example, video metadata, a video transcription, video descriptions, video captions, video objects, and/or the like. Data store 214 illustrated in FIG. 2 may include such text data, but any number of data stores and/or data sources may provide various types of text data. Such data stores and data sources may include public data, private data, and/or the like. For instance, a website service may store data associated with various videos, including transcriptions or metadata associated with the videos.

In some embodiments, the text data obtainer 220 may obtain text data by facilitating identifying or generating such text data. In this way, the text data obtainer 220 may include or access components that identify or generate text data. Advantageously, the text data obtainer can facilitate various forms or modalities of data to generate text data for use in generating a text representation. Various types of algorithms, machine learning, models, etc. may be employed to identify or generate text data, some of which are described herein to provide examples.

One example of text data that may be identified or generated is video transcriptions. In some cases, a video transcription may be generated for a video. As such, one technology that may be used to generate a video transcription is automatic speech recognition. In this way, automatic speech recognition may be used to extract audio from the video and generate a text version of the audio. Generally, automatic speech recognition recognizes and transcribes spoken language into text. In embodiments, automatic speech recognition systems use machine learning to analyze audio signals and convert them into text. In some cases, a closed caption transcript previously generated for a video may alternatively or additionally be extracted.

Another example of text data that may be identified or generated is video metadata. Video metadata may include various types of data, such as a content creator, a date, a company name, business information, brand, etc. For example, brand information and its product line may be useful for understanding story elements and related them to the brand's business context. One implementation that may be used to identify such metadata includes identifying a video title and channel name (e.g., which may be available via a web search). Thereafter, a knowledge base (e.g., Wikidata®) may be accessed to identify additional or supplemental information, such as a company name (for video advertisements).

Other example of text data that may be identified or generated include video descriptions, video captions, video objects, and/or other types of data that may be determined based on analysis of the video, or portion thereof. Accordingly, in embodiments, the text data obtainer 220 may facilitate, reference, or use technology that extracts information from a video (e.g., via video frames). For example, types of information that may be extracted from video frames includes literal text present on the frame and scene understanding of the frames.

To extract textual information present in a video frame, also referred to herein as a video description, one technology that may be used is OCR, such as PP-OCR. Text information present in the frames can reinforce the message present in a scene and inform viewers on what to expect next. In some cases, the OCR text can be filtered and only unique words are used for further processing.

To identify or extract visual and scenic elements in a video frame, also referred to herein as a video caption and a video object, respectfully, one technology that may be used is Bootstrapping Language-Image Pre-training (BLIP), such as a pre-trained BLIP-2 model. A BLIP model helps extract scene understanding from a video and verbalize the scene capturing the most salient parts. In some cases, different prompts are used to extract different types of salient information from the video frame(s). As one example, a prompt of "caption this image" can be used to obtain a caption of the frame to understand what is happening in the image. As another example, a prompt of "can you tell the objects that are present in the image?" can be used to obtain information about the objects present in each frame.

In identifying various types of text data based on analysis of the video, such as video descriptions, video captions, and video objects, keyframes of the video may be identified and/or extracted for analysis. As used herein, a keyframe refers to a video frame that is analyzed for text data. Keyframes may be identified from among the video frames in any number of ways. As one example, an optical flow-based heuristic may be used to identify, select, or extract keyframes from a set of frames. An optical flow-based heuristic includes a GMFlow model (optical flow via global matching) for extracting keyframes. GMFlow generally refers to learning optical flow via global matching. Videos generally have a number of scene changes which convey transitions in the story. In one embodiment, GMFlow framework includes a customized transformer for feature enhancement, a correlation and softmax layer for global feature matching, and a self-attention layer for flow propagation. Using an optical flow-based approach results in keyframes having higher optical flow values. The GMFlow model helps us to capture these story transitions well. In some embodiments, frames having an optical flow greater than a threshold value (e.g., 50) can be selected as keyframes. In some cases, a set of frames may be selected (e.g., from the frames with the optical flow greater than a threshold value) that have a maximum pixel velocity.

As another example, a sampling algorithm may be used to identify, select, or extract keyframes from a set of frames. Using a sampling algorithm, frames are selected as keyframes in accordance with a unified sampling rate extracted at the native frames per second. In some cases, frames that are completely dark or white may be removed. In this way, frames that have high optical flow but are uninformative can be removed or not selected for analysis.

As such, the text data obtainer 220 can obtain or identify a set of keyframes to represent events in the video extracted by any such method, including one or both methods described herein. In some cases, both an optical flow-based approach and a sampling approach may be used to identify keyframes of a video and, thereafter, each keyframe is analyzed for text data. In other cases, a particular approach may be used to identify keyframes of a video. In instances in which alternative approaches are available to use to identify keyframes of a video, the particular approach employed may be selected in a number of ways. As one example, a default method may be used. In such a case, the alternative method may be used when the default method fails (e.g., does not identify or extract more than a threshold number of keyframes or identifies or extracts more than a particular number of keyframes). As another example, the particular approach to use to identify keyframes may be based on input, such as a user selection. As yet another example, the particular approach used to identify keyframes may be based on the size or length of the video. For example, for videos shorter than a predetermined length (e.g., 120 seconds), an optical flow-based heuristic using the GMFlow model may be used to extract keyframes. Shorter videos, such as advertisement videos, have a number of scene changes which convey transitions in a story, resulting in keyframes having a higher optical flow values. As such, the GMFlow model helps to capture these story transitions well. On the other hand, longer videos, such as videos longer than the predetermined length (e.g., 120 seconds) may use the frame sampling approach. For instance, for longer videos, the GMFlow model approach can result in a large number of frames which are difficult to fit in a limited context. As such, sampling frames (e.g., every 10 sec) can result in a more efficient approach.

In some cases, the text data obtainer 220 may identify a type or extent of text data to obtain. For example, assume a text representation request 252 corresponds with an indication of a video. Upon identifying the video, the text data obtainer 220 may obtain text data associated with the specified video or type of video (e.g., an advertisement video may result in a particular set of types of text data that is different than an entertainment video). As another example, assume a text representation request 252 is provided upon a user accessing a video service. In such a case, the text data obtainer 220 may obtain user data associated with the particular user accessing the video service and select one or more text data types based on the user data (e.g., demographic, user identifier, etc.)

The text data obtainer 220 may also obtain any amount of text data. For example, in some cases, text data associated with each video frame of a video may be obtained. In other cases, text data associated with only a portion of the video frames (e.g., keyframes) may be obtained. The type and amount of text data obtained by text data obtainer 220 may vary per implementation and is not intended to limit the scope of embodiments described herein.

The text data preprocessor 222 is generally configured to preprocess text data, or a portion thereof. The text data preprocessor 222 may preprocess text data in any number of ways to effectuate a more efficient and effective text representation prompt. As described herein, a text representation prompt is generated to initiate generation of a text representation(s). As such, the text data preprocessor 222 may preprocess various text data to optimize the text data included in a model prompt. To this end, the more intentional or targeted the text data included in the model prompt, the more effective and efficient a text representation is generated.

In one embodiment, the text data preprocessor 222 preprocesses text data by removing or filtering data. In this regard, the text data preprocessor 222 can filter out or remove particular text data. As one example, the text data preprocessor 222 may filter out text data associated with negative content or language. As another example, the text data preprocessor 222 may filter out redundant data. In this way, for text (e.g., object identifiers) identified in association with multiple keyframes, redundancies can be removed as text data. Any technology may be used to identify data to remove or filter, such as negative content or redundant data, including, for example, machine learning technology. In some cases, rather than removing particular text, the text may be edited or modified as desired.

In some embodiments, the text data preprocessor 222 may generate weights for different text data. Weights may be generated for use by text representation generator 226 to generate a text representation. To this end, a weight provides an indication of focus of text data for generating output. A weight may be in any number of forms, including a numerical weight. The text data preprocessor 222 may generate a weight based on any number or type of data. As one example, a weight may be generated in association with a type of text data (e.g., video transcription, video metadata, video description, etc.). Other aspects may be additionally or alternatively used by the text data preprocessor 222 to generate a weight. For example, a video object identified as a primary video object may have a weight that is higher than a video object identified as a secondary video object or background video object.

Filtering and weighting data are only examples of different data preprocessing that the text data preprocessor 222 may perform. As can be appreciated, various other types of text preprocessing are contemplated within the scope of embodiments described herein.

The prompt generator 224 is generally configured to generate model prompts. As used herein, a model prompt generally refers to an input, such as a text input, that can be provided to text representation generator 226, such as a LLM, to generate an output in the form of a text representation(s). In embodiments, a model prompt generally includes text to influence a machine learning model, such as an LLM, to generate text having a desired content and structure. The model prompt typically includes text given to a machine learning model to be completed. In this regard, a model prompt generally includes instructions and, in some cases, examples of desired output. A model prompt may include any type of information. In accordance with embodiments described herein, a model prompt may include various types of text data. In particular, a model prompt generally includes text data corresponding with a video. Such text data may be translated from an audio of the video, directly from the video, and/or generated based on analysis of the video. Such text data may be preprocessed via text data preprocessor 222, as described herein. For example, in some cases, text data may be filtered out of a set of text data based on redundancy, negative language, and/or the like.

In embodiments, the prompt generator 224 is configured to select a set of text data for which to use to generate a text representation(s). For example, assume a text representation is to be generated for a particular video and text data associated with the video is obtained. In such a case, the prompt generator 224 may select a particular set of text data to use for generating a corresponding text representation. In this way, after various text data are filtered or updated to remove unwanted data, the prompt generator 224 may select a set of text data from the remaining data.

Text data for the model prompt may be selected based on any number or type of criteria. As one example, text data may be selected to be under a maximum number of tokens required by a text representation identifier, such as a LLM. For example, assume a LLM includes a 5000 token limit. In such a case, text data totaling less than the 5000 token limit may be selected. Such text data selection may be based on, for example, a type of text data such that a particular type of text data is included. In other cases, text data may be selected based on a value of a corresponding keyframe. For instance, text data associated with a keyframe having greater optical flows or maximum pixel velocities may be selected. In other cases, text data associated with keyframes extracted based on a flow-based heuristic may be prioritized over text data associated with keyframes associated with a sampling approach. In yet other cases, text data may be selected based on weights (e.g., highest weights, equal distribution of weights, or other criteria associated with a weight).

In addition to the model prompt including text data, additional data may be included, such as, for example, an instruction, user data, and weights. As described, weights associated with corresponding text data can be provided in the model prompt to indicate an emphasis or focus to place on corresponding text data in generating a text representation. As such, in accordance with including text data in a model prompt, the corresponding weights can also be included. Other types of information to include in a model prompt may specify an instruction to generate a text representation, user data associated with a user viewing the text representation and/or video insight, and/or the like can additionally or alternatively be included in the model prompt, depending on the desired implementation or output.

In addition, a model prompt may also include output attributes. Output attributes generally indicate desired aspects associated with an output, such as a text representation. For example, an output attribute may indicate a target temperature to be associated with the output. A temperature refers to a hyperparameter used to control the randomness of predictions. Generally, a low temperature makes the model more confident, while a higher temperature makes the model less confident. Stated differently, a higher temperature can result in more random output, which can be considered more creative. On the other hand, a lower temperature general results in a more deterministic and focused output. In one example, a temperature may be set as 0.75 for generating a text representation, thereby providing a more creative output. A temperature may be a default value, a value based on user input, or a determined value (e.g., based on a video attribute, such as a length of a video or a type of video). As another example, an output attribute may indicate a length of output. For example, a model prompt may include an instruction for a desired one paragraph or five paragraphs. As another example, a model prompt may include an instruction for a maximum number of characters or a target range of characters. Any other instructions indicating a desired output is contemplated within embodiments of the present technology. As another example, an output attribute may indicate a target language for generating the output. For example, the text data may be provided in one language, and an output attribute may indicate to generate the output in another language.

The prompt generator 224 may format the text data and output attributes in a particular form or data structure. One example of a data structure for a model prompt is as follows:

```
{ Instruction to Generate a Text Representation
{ Video Identifier
```

-continued

```
{ Output Attributes
  { Temperature
{ Text Data
  { Video Transcription
  { Video Metadata
  { Video Description
  { Video Caption(s)
  { Video Object(s)
```

As described, in embodiments, the prompt generator 224 generates or configures model prompts in accordance with size constraints associated with a machine learning model. As such, the prompt generator 224 may be configured to detect the input size constraint of a model, such as a LLM or other machine learning model. Various models are constrained on a data input size they can ingest or process due to computational expenses associated with processing those inputs. For example, a maximum input size of 14096 tokens (for davinci models) can be programmatically set. Other input sizes may not necessarily be based on token sequence length, but other data size parameters, such as bytes. Tokens are pieces of words, individual sets of letters within words, spaces between words, and/or other natural language symbols or characters (e.g., %, $, !). Before a language model processes a natural language input, the input is broken down into tokens. These tokens are not typically parsed exactly where words start or end-tokens can include trailing spaces and even sub-words. Depending on the model used, in some embodiments, models can process up to 4097 tokens shared between prompt and completion. Some models (e.g., GPT-3) takes the input, converts the input into a list of tokens, processes the tokens, and converts the predicted tokens back to the words in the input. In some embodiments, the prompt generator 224 detects an input size constraint by simply implementing a function that calls a routine that reads the input constraints.

As described, the prompt generator 224 can determine which data, for example, obtained by the text data obtainer 220, preprocessed by the text data preprocessor 222, or the like is to be included in the model prompt. In some embodiments, the prompt generator 224 takes as input the input size constraint and the text data to determine what and how much data to include in the model prompt. By way of example only, assume a model prompt is being generated in relation to a particular video. Based on the input size constraint, the prompt generator 224 can select which data to include in the model prompt. As described, such a data selection may be based on any of a variety of aspects. As one example, the prompt generator 224 can first call for the input size constraint of tokens. Responsively, the prompt generator 224 can then tokenize each of the text data candidates to generate tokens, and then responsively and progressively add each text data ranked/weighted from highest to lowest if and until the token threshold (indicating the input size constraint) is met or exceeded, at which point the prompt generator 224 stops.

The prompt generator 224 may generate any number of model prompts. As one example, an individual model prompt may be generated for a particular video. In this way, a one-to-one model prompt may be generated for a corresponding item. As such, text data associated with the particular video is included in the model prompt. As another example, a particular model prompt may be generated to initiate text representations for multiple videos. For instance, a model prompt may be generated to include an indication of a first video and corresponding text data, a second video and corresponding text data, and so on. As yet another example, a particular model prompt may be generated to initiate a text representation for a portion of a video. In this way, a text representation is generated for a portion of a video, while other text representations may be generated for other portions of the video.

In embodiments, the prompting pipeline is zero shot. In this way, examples are not included in the model prompts. In other embodiments, examples may be included in the model prompt, for example, example text representations can be included in the model prompt.

The text representation generator 226 is generally configured to identify or generate text representations. In this regard, the text representation generator 226 utilizes various text data to generate a text representation(s) associated with a video(s). In embodiments, the text representation generator 226 takes, as input, a model prompt or set of model prompts generated by the prompt generator 224. Based on the model prompt, the text representation generator 226 can generate a text representation or set of text representations associated with a video(s) indicated in the model prompt. For example, assume a model prompt includes a set of text data associated with a particular video. In such a case, the text representation generator 226 generates a text representation(s) associated with the particular video based on the set of text data included in the model prompt.

Advantageously, as the text representation is generated based on various modalities of a video, the text representation is generally generated in a more holistic approach. As such, the text representation can be more representative of the video and enable more constructive insight to potential viewers and providers. Further, the text representation is generated in accordance with desired output attributes, thereby efficiently generating an effective text representation.

The text representation generator 226 may be or include any number of machine learning models or technologies. In some embodiments, the machine learning model is a Large Language Model (LLM). A language model is a statistical and probabilistic tool which determines the probability of a given sequence of words occurring in a sentence (e.g., via NSP or MLM). In this way, it is a tool which is trained to predict the next word in a sentence. A language model is called a large language model when it is trained on enormous amount of data. Some examples of LLMs are GOOGLE's BERT and OpenAI's GPT-2, GPT-3, and GPT-4. For instance, GPT-3, is a large language model with 175 billion parameters trained on 570 gigabytes of text. These models have capabilities ranging from writing a simple essay to generating complex computer codes-all with limited to no supervision. Accordingly, an LLM is a deep neural network that is very large (billions to hundreds of billions of parameters) and understands, processes, and produces human natural language by being trained on massive amounts of text. In embodiments, a LLM performs automatic summarization (or text summarization). Such automatic summarization includes the process of NLP text summarization, which is the process of breaking down text (e.g., several paragraphs) into smaller text (e.g., one sentence or paragraph). This method extracts vital information while also preserving the meaning of the text. This reduces the time required for grasping lengthy text content without losing vital information. In embodiments, extractive and/or abstractive summarization can be performed to capture essence of original content. An LLM can also perform machine translation, which includes the process of using machine learning to automatically translate text from one language to another without human involvement. Modern machine translation goes beyond simple word-to-word translation to communicate the full meaning of the original language text in the target language. It analyzes all text elements and recognizes how the words influence one another.

As such, as described herein, the text representation generator 226, in the form of a LLM, can obtain the model prompt and, using such information in the model prompt, generate a text representation(s) for a video or set of videos. In some embodiments, the text representation generator 226 takes on the form of a LLM, but various other machine learning models can additional or alternatively be used.

As described, any number of text summarizations can be generated for a video. For example, in one embodiment, an instruction to generate multiple (e.g., three) text summarizations may be provided in the model prompt. As another example, text summarizations may be generated for different portions of a video. For instance, a first text summarization may be generated for a first video portion, and a second text summarization may be generated for a second video portion.

The text representation provider 228 is generally configured to provide text representations. In this regard, upon generating a text representation(s), the text representation provider 228 can provide such data, for example for display via a user device. To this end, in cases in which the video insights service 212 is remote from the user device, the text representation provider 228 may provide a text representation(s) to a user device for display to a user that initiated the request for viewing a text representation(s).

Alternative or additionally, the text representation may be provided to a data store for storage or another component or service, such as a video service (e.g., video service 118 of FIG. 1). Such a component or service may then provide the text representation for display, for example, via a user device. For instance, as described herein, in some cases, text representations may be generated in a periodic manner. As one example, text representations may be generated for a set of videos in off-hours (hours in which computing resources are more available and not used by other processes). Such text representations can then be stored, for example in data store 214. Thereafter, assume a user navigates, via a user device, to a website or application providing various videos. In association with navigating to the website/application, or a particular video associated therewith, a video service can access an appropriate text representation (e.g., corresponding with the particular video) and provide the text representation for display in association with the corresponding video.

The text representation may be provided for display in any number of ways. In some examples, the text representation is provided in association with the corresponding video listing. For example, a video may be presented with corresponding data, including text representations of the video. In some cases, the text representation is automatically displayed in association with the video. In other cases, a user may select to view the text representation. For instance, a link may be presented that, if selected, presents the text representation (e.g., integrated with the video, or provided in a separate window or pop-up text box).

In addition or in the alternative to providing a text representation for display, a text representation can be provided for utilization, for example, to identify a video insight(s) for a video, as described more fully below. In this regard, the text representation provider 228 can provide a text representation to video insight manager 218 or store for utilization by the video insight manager 218.

Turning to the video insights manager 218, the video insights manager 218 is generally configured to generate video insights. In embodiments, the video insights manager 218 includes an input data obtainer 230, an input prompt generator 232, a video insight generator 234, and a video insight provider 236. According to embodiments described herein, the video insights manager 218 can include any number of other components not illustrated. In some embodiments, one or more of the illustrated components 230, 232, 234, and 236 can be integrated into a single component or can be divided into a number of different components. Components 230, 232, 234, and 236 can be implemented on any number of machines and can be integrated, as desired, with any number of other functionalities or services.

The input data obtainer 230 may obtain or receive input data for use in generating one or more video insights. Input data generally refers to data used for generating a video insight. In this regard, the input data obtainer 230 may obtain a text representation to initiate generation and/or providing of a video insight(s) in association with a video. In some cases, the text representation may be provided along with a video insight request. In embodiments, a video insight request 254 may be provided as input 250. A video insight request generally includes a request or indication to identify a set of video insights, for example, in association with a video. A video insight request may include, for example, a video(s) (e.g., video identifier), a text representation associated with the video, etc.

A video insight request 254 may be provided by any service or device. For example, in some cases, a video insight request 254 may be initiated and communicated via a user device, such as user device 110 of FIG. 1. For example, assume a user desires to use or view one or more video insights associated with a video. In such a case, a video insight request 254 may be initiated that includes a request to identify a video insight(s) associated with a video. As another example, a video insight request 254 may be initiated and communicated via a video service. For instance, assume a user inputs a video search. To facilitate the search, video insights associated with the video may be desired and, as such, a video insight request 254 may be generated. In one example, the video insight request 254 may specify a set of one or more desired types of video insights. For example, a video insight request may specify a desire to identify an emotion and a topic associated with a video. Specific types of video insights to generate may be specified by a user, automatically determined, based on default values, etc. A video insight request can be generated in any of a number of ways, including via an input or command, via selection of a link or button, and/or the like.

Alternatively or additionally, as described, a video insight request 254 may be automatically initiated and communicated to the input data obtainer 230. For example, a video service that uses video insights(s) (e.g., to analyze or present) may automatically initiate video insight requests, for instance, based on input (e.g., a search query or selection to view a video) by a user, obtaining a set of data requests, or other criteria. As can be appreciated, the automated initiation of a video insight request may be dynamically determined, for instance, based on attributes associated with a video(s). As another example, upon generating a text representation via the text representation manager 216, the text representation provider 228 may provide a video insight request to the input data obtainer 230 to initiate generation of one or more video insights associated with a video.

Although not illustrated, input 250 may include other information communicated in association with video insight request 254. For example, the text representation, or indication thereof, may be provided in association with the video insight request.

In cases in which a video insight request 254 indicates a video and/or text representation, the input data obtainer 230 can obtain the corresponding text representation for use in generating a video insight(s). For instance, a video insight request may specify a video and/or text representation identifier. The input data obtainer 230 may then access a data store and lookup and obtain the text representation that corresponds with the video and/or text representation identifier.

The input data obtainer 230 can receive or obtain data from various sources for utilization in identifying a video insight(s). As described above, in some cases, data may be obtained as input 250 along with a video insight request 254. In other cases, data may be obtained from the text representation manager 216 and/or data store 214. Further, the input data obtainer 230 may obtain input data from any number of sources or data stores, such as data store 214. Such data stores and data sources may include public data, private data, and/or the like.

The input data obtainer 230 may also obtain any amount of data. For example, in some cases, an entire set of text representations may be obtained for identifying corresponding video insights in a batch manner. In another example, a single text representation from which to generate a video insight(s) may be obtained. The type and amount of data obtained by input data obtainer 230 may vary per implementation and is not intended to limit the scope of embodiments described herein.

The input prompt generator 232 is generally configured to generate input prompts, which may be performed in a similar manner as that described with respect to prompt generator 224. Although illustrated as separate components, a single component, or any other number of components may be used. As described herein, video insight generator 234 may be in any number of forms, including various forms of machine learning models, such as a classifier(s), a generator(s), a LLM(s), and/or the like. As such, the input prompt generated by the input prompt generator 232 may be designed based on the technology used to identify or generate video insights.

An input prompt generally refers to an input, such as a text input, that can be provided to video insight generator 234, such as an LLM or classifier(s), to generate an output in the form of a video insight. Generally, the input prompt includes the text representation of the video for which video insights are desired. In embodiments in which a LLM is used to identify or generate video insights, the input prompt may include a video insight instruction, a text representations(s), a set of video insight types, a set of classes or multiple sets of classes, among other things. A video insight instruction generally refers to an instruction or request to generate one or more video insights. A set of video insight types generally refers to types of video insights to generate. Various video insight types include, for example, emotion, persuasion strategy, topic, action, reason, and/or the like. A set of classes generally refers to classes available or defined for which to categorize an input for a particular video insight type. For example, for emotion, a set of classes may include happy, sad, surprised, etc. A text representation generally refers to a representation or story in the form of text generated (e.g., via a LLM) to describe the video.

In addition, the input prompt for a LLM may include output attributes. As described, output attributes generally indicate desired aspects associated with an output. By way of example, output attributes may include a number of video insights that may be identified for a video, a number of video insights that may be identified for a particular type of video insights, a likelihood (e.g., probability) of a video insight, the like. For instance, assume a text representation is provided as input for which to identify a video insight(s). In such a case, output attributes may indicate to output a single, primary video insight and a maximum of three secondary video insights (e.g., for a particular type of video insight). For instance, a primary topic may be identified for a video and two secondary topics may be identified for the video. As another example, an output attribute may indicate a target temperature to be associated with the output. As described, a temperature refers to a hyperparameter used to control the randomness of predictions. Generally, a low temperature makes the model more confident, while a higher temperature makes the model less confident. In one example, a temperature may be set as 0.3, or other lower number, for generating a video insight(s) such that the video insight is generated more aligned with being extractive rather than creative. A temperature may be a default value, a value based on user input, or a determined value (e.g., based on a video attribute, such as a length of a video or a type of video). As another example, an output attribute may indicate a target language for generating the output. For example, the text representation may be provided in one language, and an output attribute may indicate to generate the output in another language. Any other instructions indicating a desired output are contemplated within embodiments of the present technology.

The input prompt generator 232 may format the data in various forms or data structures. One example of a data structure for an input prompt for a LLM is as follows:

```
{ Video Insight Generation Request
{ Text Representation
{ Video Insight Type 1: Set of Classes Associated with Video Insight
Type 1
{ Video Insight Type N: Set of Classes Associated with Video Insight
Type N
```

As described, in embodiments, the prompt generator 232 generates or configures model prompts in accordance with size constraints associated with a machine learning model, as described herein with respect to prompt generator 224. In embodiments, the prompting pipeline is zero shot. In this way, examples are not included in the model prompts. In other embodiments, examples may be included in the model prompt, for example, example related to how to perform the task (e.g., emotion classification) can be included in the model prompt.

In embodiments in which other machine learning models, such as classifiers and/or generators, are used to identify or generate video insights, the input prompt may be generated in a different format. Generally, the input prompt for a classifier and/or generator includes or references a text representation. The set of classes associated with a classifier, for example, need not be included in the input prompt. For example, for an input prompt generated for an emotion classifier, the input prompt does not need to include a set of emotion classes, as the emotion classifier is configured to classify among the set of emotion classes.

The prompt generator 232 may generate any number of input prompts. As one example, for input prompts generated for a LLM, an input prompt may be generated with a single text representation and a particular type of video insight. As another example, an input prompt may be generated with a single text representation for a set of video insight types. As yet another example, an input prompt may be generated with multiple text representations for one or more video insight types. For an input prompt generated for a set of classifiers and/or generators, a single input prompt may be generated and distributed to multiple classifiers/generators. Alternatively, an input prompt can be generated specific for each classifier/generator. For instance, a first input prompt may be generated for an emotion classifier, and a second input prompt may be generated for a topic classifier.

The video insight generator 234 is generally configured to identify video insights associated with videos, or text representations thereof. In this regard, the video insight generator 234 utilizes a text representation to identify one or more video insights associated with a video. In some cases, the video insight generator 234 classifies a text representation into a video insight class or category for a particular type of video insight. In embodiments, the video insight generator 234 can take, as input, an input prompt or set of input prompts generated by the prompt generator 232. Based on the input prompt, the video insight generator 234 can identify a video insight(s) associated with a text representation indicated in the input prompt. For example, assume an input prompt includes a text representation generated for a video. In such a case, the video insight generator 234 identifies a video insight(s) associated with the video based on the text representation included in the input prompt.

The video insight generator 234 may be or include any number or type of machine learning models or technologies. In some embodiments, the video insight generator 234 includes a machine learning model in the form of an LLM. As such, as described herein, the video insight generator 234, in the form of an LLM, can obtain the input prompt and, using such information in the input prompt, identify a video insight or set of video insights for a text representation. The video insight generator 234 in the form of an LLM may generate any number of video insights in response to an input prompt. As one example, assume an input prompt includes one or more text representations associated with a particular video. In such a case, the text representation(s) can be used to identify any number of video insights for the video. In some cases, the number of video insights produced or generated can be based on the input prompt. For instance, an input prompt may indicate a target, maximum, or minimum number of video insights to generate. For example, a set of types of video insights to generate may be designated as well as a number of video insights associated with each video insight type (e.g., the input prompt may specify to generate one video insight related to emotion, persuasion strategy, topic, action, and reason). In another example, assume an input prompt includes text representations associated with a multiple videos. In such a case, the text representations can be used to identify any number of video insights for each of the videos. Although the video insight generator 234 is illustrated as separate from the text representation generator 226, in some cases, a same LLM is used to perform the functionalities described herein.

In other embodiments, the video insight generator 234 includes a machine learning model in the form of classifier or set of classifiers. A classifier is generally configured to identify or classify which of a set of categories to which an observation belongs. As such, as described herein, the video insight generator 234, in the form of a classifier, can obtain the input prompt and, using such information in the input prompt, identify a video insight or set of video insights for a text representation by classifying the text representation into a class(es) of a set of classes. In some cases, a classifier may be associated with a particular type of video insight. For example, one classifier may be used to classify a text representation into an emotion category, and another classifier may be used to classify the text representation into a persuasion strategy classifier. In some implementations, a multiclass classifier is used, while in other implementations a binary classifier is used. Further, in some cases, a single output or class may be identified, while in other cases, multiple output of classes may be identified (e.g., a first and a second topic). As can be appreciated, the classifiers may also output probabilities or likelihoods associated with the predicted classification. In some cases, the classifiers used are trained using a training dataset. For instance, for an emotion classifier, the classifier may be trained using a set of emotion data.

Various classifiers that may be used include an emotion classifier, a persuasion strategy classifier, and a topic classifier. An emotion classifier is generally used to classify emotions associated with a video or text representation thereof. Emotion classes may be of any number and type. In some cases, emotion classes are predetermined using a predetermined set of emotions. In other cases, the emotion classifier can be trained to identify emotion classes. Examples of emotion classes include joy, trust, fear, anger, disgust, anticipation, and unclear.

Figure 3:
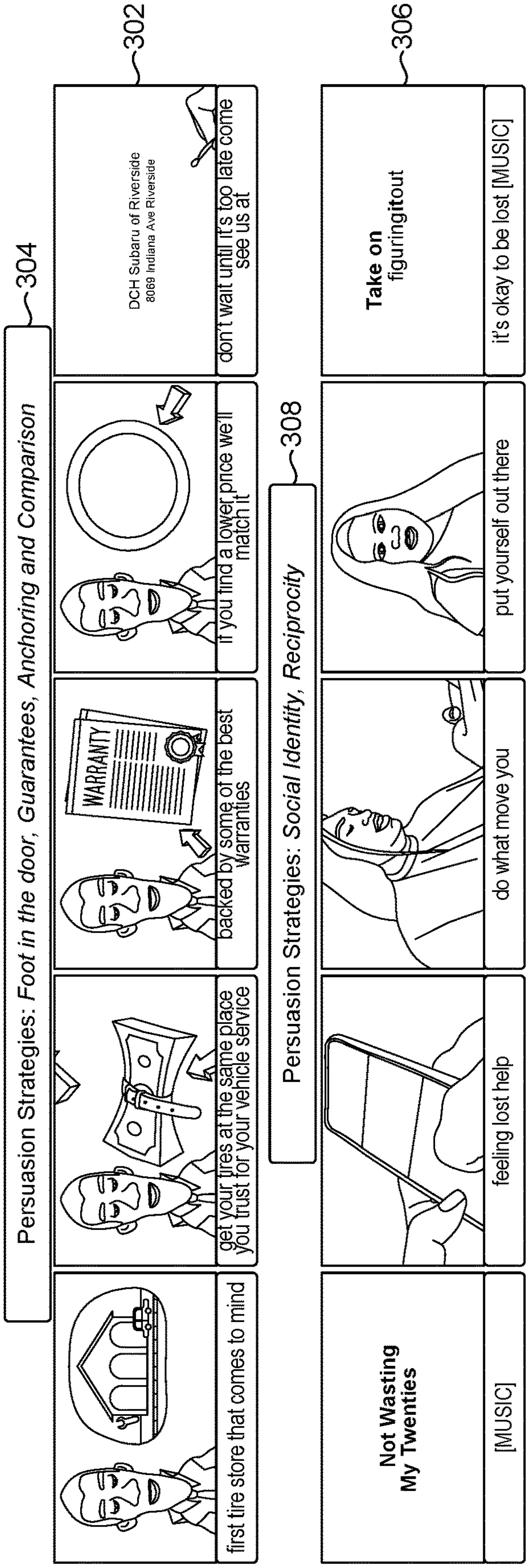
FIG. 3 provides examples of persuasion strategy labels generated for videos, in accordance with embodiments of the present technology.

A persuasion strategy classifier is generally used to classify persuasion strategies. Persuasion strategies generally refer to a strategy used to persuade a viewer. For example, for brand communication, generally a primary purpose is to change people's believes and actions, that is, to persuade. Examples of persuasion strategies include social identity, concreteness, anchoring and comparison, overcoming reactance, reciprocity, foot-in-the-door, authority, social impact, anthropomorphism, scarcity, social proof, and unclear. In some cases, persuasion strategy classes are predetermined using a predetermined set of persuasion categories. In other cases, the persuasion strategy classifier can be trained to identify persuasion strategy classes. As one example, videos can be annotated (e.g., via a human annotator(s)) to provide or indicate persuasion strategies for a video. As can be appreciated, any number of persuasion strategies can be associated with a video, or a portion of a video. The labeled videos can then be used to train the persuasion strategy classifier. With reference to FIG. 3, FIG. 3 provides examples of persuasion strategy labels generated for videos, which may then be used to train the persuasion strategy classifier. In these examples, relevant keyframes are selected and used to annotate the video with persuasion strategies. For example, the relevant keyframes 302 are analyzed and, such analysis is used to identify the persuasion strategies 304 in association with that video. For the relevant keyframes 306 of another video, persuasion strategies 308 are identified in association with that video.

A topic classifier is generally used to classify topics. Topics generally refer to a subject matter associated with a video. In some cases, topic classes are predetermined using a predetermined set of topic classes. In other cases, the topic classifier can be trained to identify topic classes. Examples of topics include sports, education, shopping, entertainment, etc. As can be appreciated, any granularity of topics may be used. For instance, more specific and detailed topics may be alternatively or additional used.

In yet other embodiments, the video insight generator 234 includes machine learning technology in the form of a generation model or set of models. A generation model generally refers to a model that can generate new instances. A generation model may be in any number of forms, and is not intended to be limited herein. Further, generation models can be used to generate any type of visual insight. As one example, a generation model may be an action generation model used to generate an action associated with a video, or text representation thereof. An action generally refers to an intended action desired to be taken in accordance with viewing a video. For example, an action may refer to a purchase an item, visit a website, etc. As another example, a generation model may be a reason generation model used to generate a reason associated with a video. A reason generally refers to an explanation of the desired action, that is, what is the reason behind an action. Examples of reasons include exploration, increase revenue, etc. In some embodiments, such generation models are trained on data.

Any other type of models, algorithms, machine learning, and/or the like can be used by the video insight generator 234 to identify video insights. Further, any number of technologies may be used. In some cases, the particular technology used may be based on desired technologies to implement, the particular type of video insight desired, etc.

The video insight provider 236 is generally configured to provide video insights. In this regard, upon identifying a video insight, the video insight provider 236 can provide such data, for example for display via a device (e.g., user device). To this end, in cases in which the video insight manager 218 is remote from the user device, the video insight provider 236 may provide a video insight(s) for display associated with initiating a request for a video insight. In embodiments, a video insight is generated and provided for display in real time. In this way, in response to an indication to identify a video insight, a video insight is identified and provided for display in real time.

Alternatively or additionally, video insights may be provided to a data store for storage or to another component or service, such as a video service. Such a component or service may then provide the video insight(s) for display, for example, via a user device. For instance, as described herein, in some cases, video insights may be identified in a periodic or batch manner. As one example, video insights may be generated in off-hours (hours in which computing resources are more available and not used by other processes). Such identified video insights and corresponding videos, or indications thereof can then be stored, for example in data store 214.

Video insights may be provided for display in any number of ways. In some examples, the video insight is provided in accordance with the corresponding text representation, video, and/or representation of the video (e.g., an icon, thumbnail, or link). In addition to the video insights, other information may be presented, such as a probability or likelihood associated with the video insights. In some cases, the video insights and corresponding information is automatically displayed. In other cases, a user may select to view such information. For instance, a link may be presented that, if selected, presents video insights.

In addition or in the alternative to providing video insights for display, video insights can be provided for utilization, for example, to analyze videos, to provide recommendations, and/or the like. In this regard, the video insight provider 236 provides video insights and, in some cases, corresponding data (e.g., probabilities) for analysis. As one example, video insights, and corresponding information, may be provided to a video service, such as video service 118 of FIG. 1. The video service may automatically analyze the video insights, determine trends associated with the video insights, identify marketing or video search result approaches in associated with video insights, etc. and provide results in association therewith (e.g., for display). In yet other cases, video insights can be provided as tags or labels (e.g., as metadata) in association with a video. In this regard, a video may include tags conveying semantic information or content-based attributes. For instance, assume visual insights including emotion, persuasion strategy, topic, action, and reason are generated. In such a case, the video can be automatically tagged or labeled with the generated visual insights indicating the emotion, persuasion strategy, topic, action, and reason associated with the video. In some cases, different visual insights are generated for different portions of the video. In such cases, the different portions of the video can be tagged with the different visual insights corresponding therewith.

By way of example only, and with reference to FIG. 4, assume video insights are being generated for a video 402. In such a text, various text data is obtained. For instance, text data in the form of a transcript 404 can be obtained, among other types of text data. For instance, video objects may be identified from each of the presented frames associated with video 402. The text data, including transcript 404, is included in a model prompt provided to an LLM to generate a text representation 406. The text representation 406 provides a summary or representation of the text associated with the video. The text representation 406 is then provided as input to obtain various video insights 408, such as, for example, a topic insight, an emotion insight, a persuasion strategy insight, an action insight, and a reason insight. In some cases, the video insights 408 are generated using classifiers and/or generators. Alternatively or additionally, the video insights 408 are generated using an LLM, such as the LLM used to generate the text representation 406. As described, the video insights 408 may be used to label or tag the video 402, to provide for display, to provide for analysis, etc.

Figure 5:
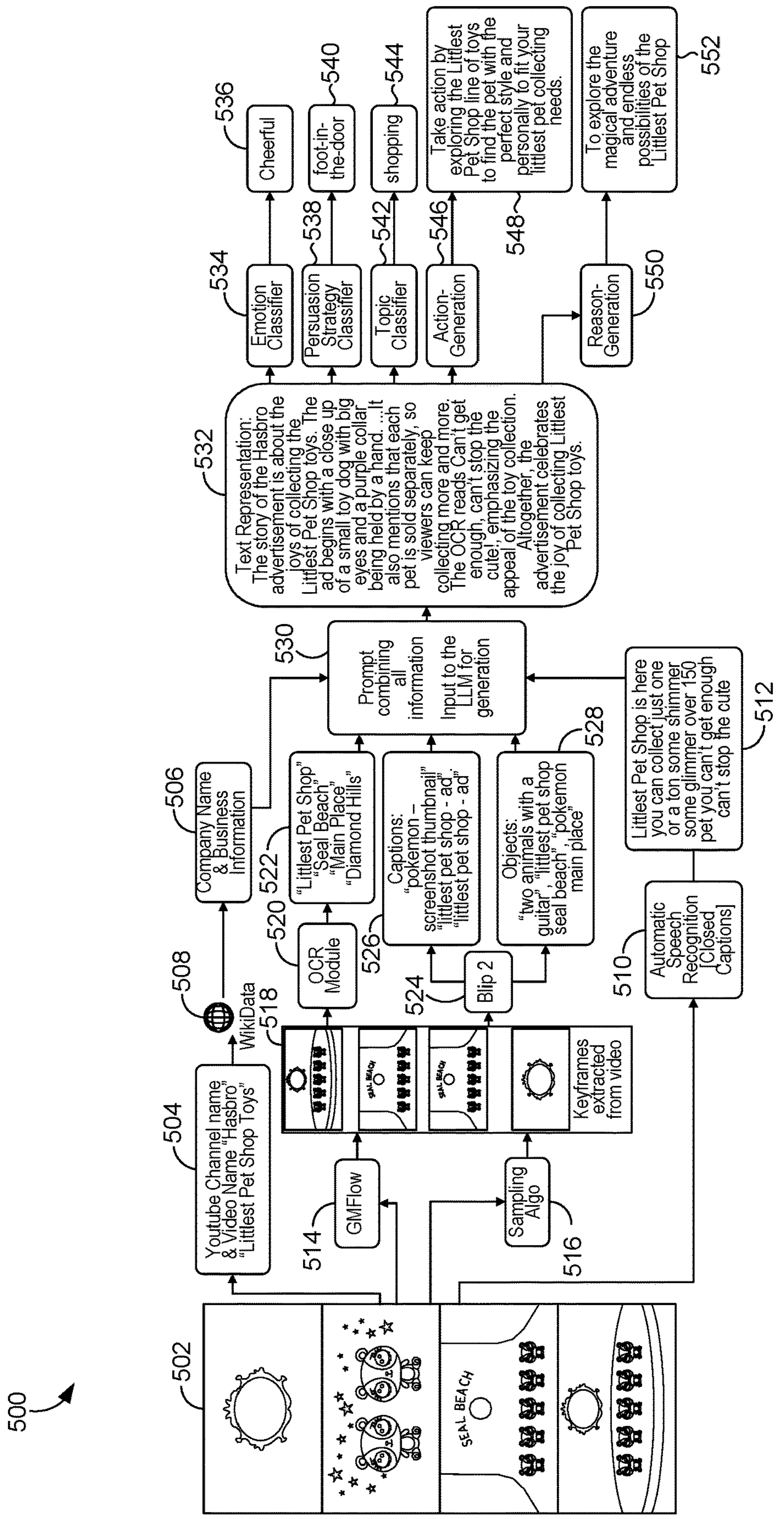
FIG. 5 provides an example implementation for generating video insights based on a text representation, in accordance with embodiments of the present technology.

FIG. 5 provides one example implementation 500 for generating video insights based on machine-generated text representations associated with a video, in accordance with embodiments described herein. FIG. 5 provides an illustrative framework to generate a text representation from a video and perform downstream video-understanding tasks to identify video insights. Initially, a video 502 is analyzed in various manners to identify text for use in generating a text representation. As shown, the video is analyzed to identify video information 504. The video information may include a video name, a channel, etc. In some cases, such data is used to identify more video metadata 506, such as the company name and business name. For instance, Wikidata® 508 may be used to identify company name and business information based on the video information 504. In addition, the automatic speech recognition 510 is performed to identify video transcript 512.

The video 502 is also analyzed to identify keyframes for which text can be generated. For instance, GMFlow 514 is one approach that can be used to extract keyframes 518. Alternatively or additionally, sampling algorithm 516 is another approach that can be used to extract keyframes 518. The keyframes 518 are then analyzed to generate various text associated with the keyframes 518. For example, an OCR module 520 can be applied to identify text descriptions 522 associated with the keyframes. In this regard, text descriptions 522 include text presented in the keyframe. BLIP-2 technology 524 is used to verbalize the video to generate captions 526 and objects 528. Although illustrated as applying OCR and BLIP-2 technology to a sample of frames, in other embodiments, each frame can be analyzed to identify descriptions, captions, and objects associated therewith.

A prompt 530 is then generated using the various types of text data. For example, the video metadata 506, the descriptions 522, the captions 526, the objects 528, and the transcript 512 can be concatenated into the prompt 530. The prompt 530 is provided to a LLM to generate a text representation 532 that represents the text associated with the video. The text representation 532 is used as input to generate various video insights. In this example, the text representation 532 is input to an emotion classifier 534 to obtain an emotion class 536 (e.g., "cheerful"), a persuasion strategy classifier 538 to obtain a persuasion strategy class 540 (e.g., "foot-in-the-door), a topic classifier 542 to obtain a topic class 544 (e.g., "shopping"), an action generator 546 to obtain an action 548 and a reason generator 550 to obtain a reason 552. In other embodiments, an LLM can be used to identify any of such visual insights 536, 540, 544, 548, and 552, among others.

Figure 6:
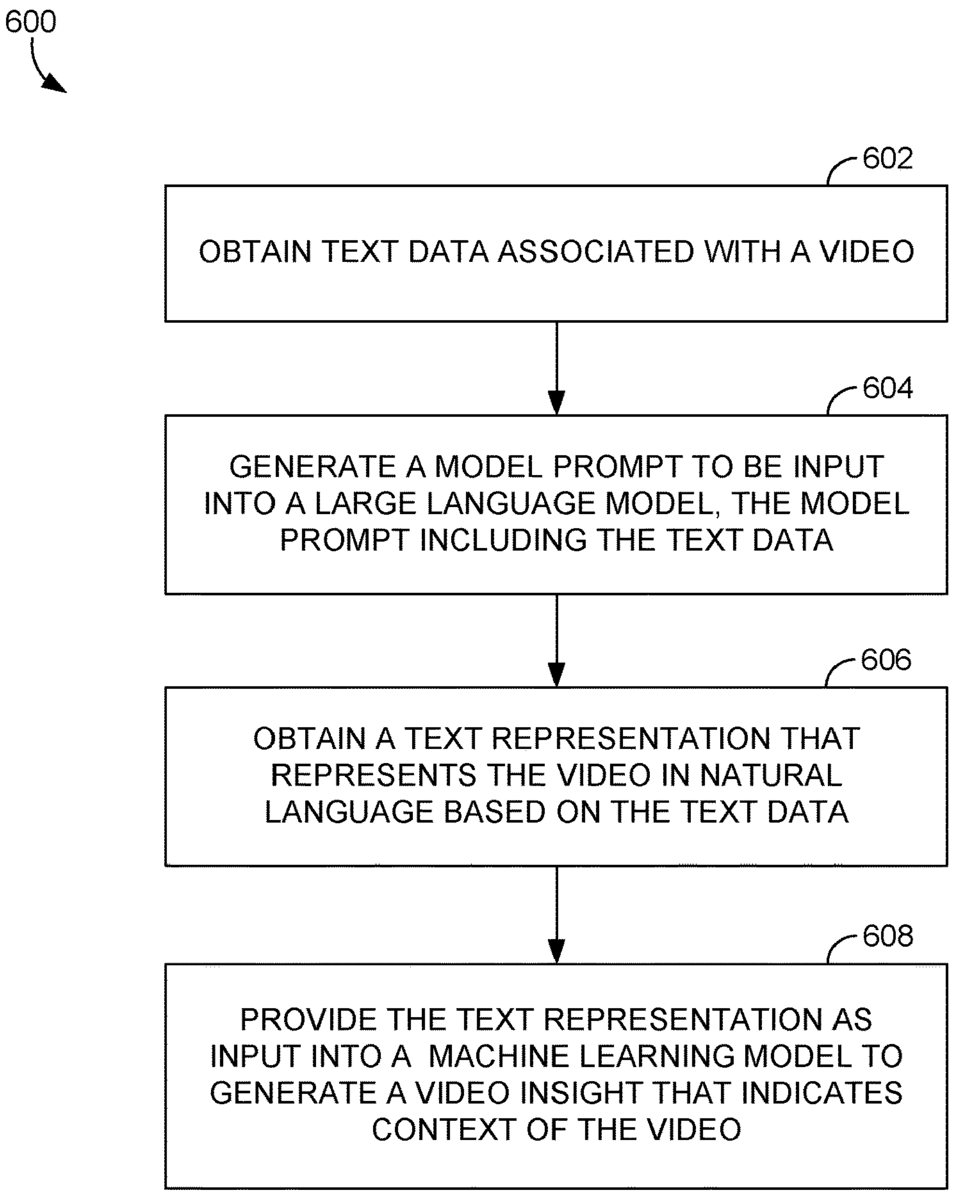
FIG. 6 provides a first example method for facilitating efficient generation of video insights based on a text representation, in accordance with aspects of the technology described herein.
Figure 7:
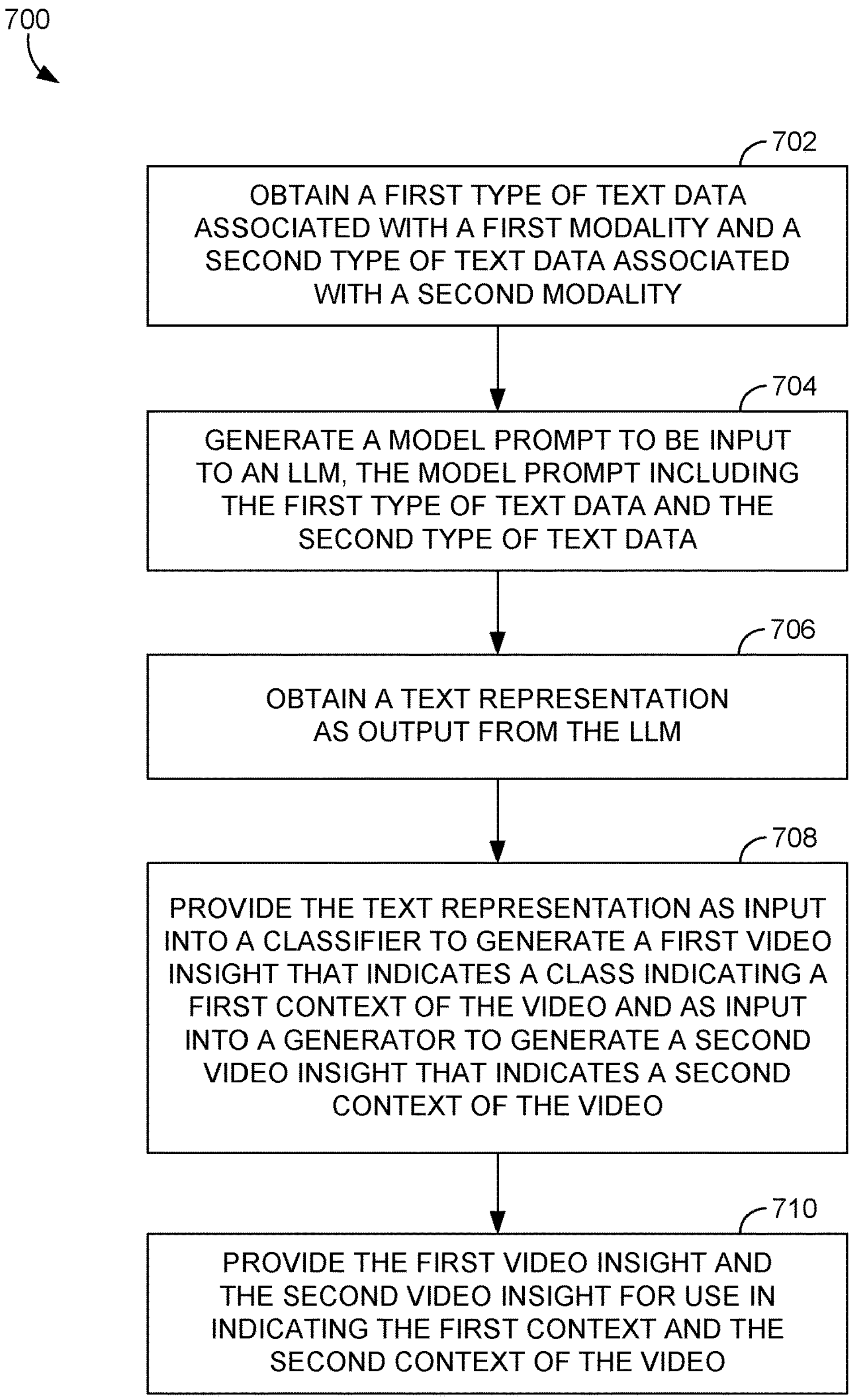
FIG. 7 provides a second example method for facilitating efficient generation of video insights based on a text representation, in accordance with aspects of the technology described herein.
Figure 8:
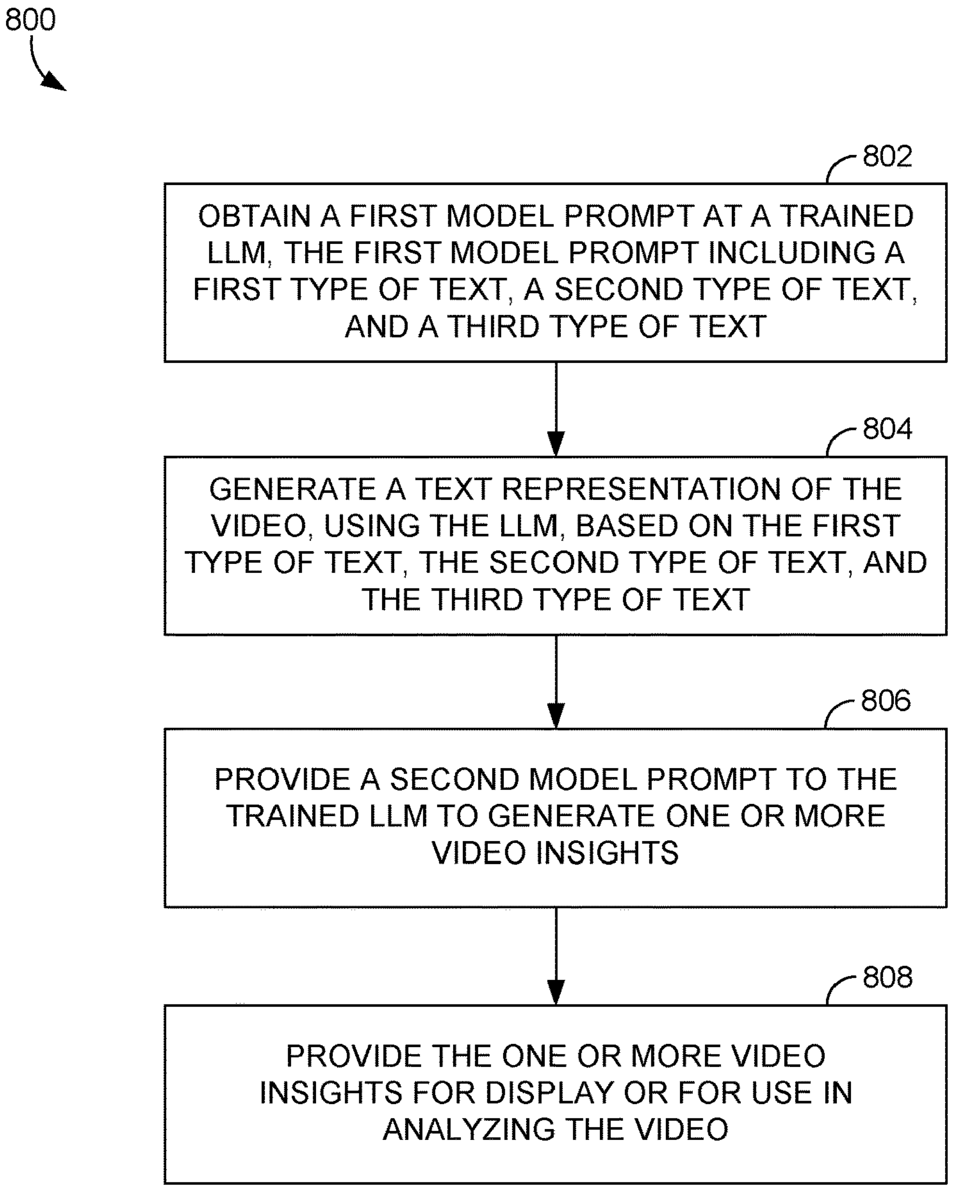
FIG. 8 provides a third example method for facilitating efficient generation of video insights based on a text representation, in accordance with aspects of the technology described herein.

Exemplary Implementations for Efficiently Generating Video Insights Based on Text Representations As described, various implementations can be used in accordance with embodiments described herein. FIGS. 6-8 provide methods of facilitating efficient generation of video insights using automatically generated text representations of videos. Methods 600, 700, and 800 can be performed by a computer device, such as device 900 described below. The flow diagrams represented in FIGS. 6-8 are intended to be exemplary in nature and not limiting.

Turning initially to method 600 of FIG. 6, method 600 is directed to facilitating efficient generation of video insights, in accordance with embodiments of the present technology. Initially, at block 602, text data associated with a video is obtained. As described herein, the text data can correspond with a plurality of modalities of the video. For example, some text data corresponds with the audio of the video, while other text data corresponds with images of the video. Examples of text data includes video metadata, video descriptions, video captions, video objects, and a video transcription. The video descriptions, video captions, and/or video objects can be identified in association with keyframes extracted from the video. In some cases, keyframes to analyze may be identified using an optical flow-based approach and/or a sampling-based approach.

At block 604, a model prompt to be input into a large language model is generated. In embodiments, the model prompt includes the text data associated with the video. The model prompt can be generated by concatenating different types of text data, such as, for example, metadata, descriptions, captions, objects, transcriptions, etc. At block 606, a text representation that represents the video in natural language based on the text data is obtained. Generally, the text representation is generated using a large language model. The text representation may be of any length, but generally is intended to be a shortened representation of the video (as compared to the video transcript) such that relevant aspects are included in the text representation while irrelevant aspects are no included in the text representation. At block 608, the text representation is provided as input into a machine learning model to generate a video insight that indicates context of the video. In some embodiments, the machine learning model that generates the video insight is a classifier to identify an emotion class, a persuasion strategy class, or a topic class. In other embodiments, the machine learning model that generates the video insight is a generator to generate an action or a reason associated with the video. In yet other embodiments, the machine learning model that generates the video insight is the large language model to generate an emotion, a persuasion strategy, a topic, an action, and/or a reason associated with the video. As discussed herein, various video insights can be generated using different types of technologies, such as classifiers, generators, and/or LLMs. In accordance with generating one or more video insights, such insights can be provided, for example, for display in association with the video, for analysis of the video, for a tag of the video, among other things.

Turning to FIG. 7, FIG. 7 provides a method 700 directed to facilitating efficient generation of video insights, in accordance with embodiments of the present technology. Initially, at block 702, first type of text data associated with a first modality of a video and a second type of text data associated with a second modality of the video is obtained. Modalities of the video may include, for example, audio, images, text, etc. In some embodiments, the text data is preprocessed, for example, to remove redundant data. At block 704, a model prompt to be input into a large language model is generated. The model prompt includes the first type of text data and the second type of text data associated with the video. In some examples, the model prompt also includes a temperature indicator to indicate an extent of creativity to use in generating the text representation. At block 706, a text representation is obtained, as output from the large language model. The text representation generally represents the video in natural language based on the first type of text data and the second type of text data. At block 708, the text representation is provided as input into a classifier to generate a first video insight that indicates a class indicating a first context of the video and as input into a generator to generate a second video insight that indicates a second context of the video. A classifier may be a classifier to classify emotion associated with the video, a classifier to classify persuasion strategy associated with the video, a classifier to classify a topic for the video, and/or the like. A generator may generate an insight, such as an action associated with the video and/or a reason associated with the action. At block 710, the first video insight and the second video insight are provided for use in indicating the first context and the second context of the video. For example, the first video insight and second video insight may be used to tag the video. As another example, the first and second video insights may be presented to a user for providing understanding of the video.

With reference to FIG. 8, FIG. 8 is directed to another method for facilitating efficient generation of video insights, in accordance with embodiments of the present technology. Initially, at block 802, a first model prompt that is obtained at a trained large language model. The first model prompt can include a first type of text comprising a transcription associated with a video, a second type of text comprising a metadata associated with the video, and a third type of text based on analysis of a frame of the video. The third type of text can be, for example, a video description, a video caption, and/or a video object. The first model prompt may exclude an example text representation such that zero-shot video understanding is performed. At block 804, a text representation of the video is generated, using the trained large language model, based on the first type of text, the second type of text, and the third type of text. The text representation providing a natural language story for the video. At block 806, a second model prompt is provided to the trained large language model to generate one or more video insights. The second model prompt includes the text representation and an indication of a type of desired video insight. In embodiments, the second model prompt includes a set of classes associated with a particular type of desired video insight. The particular type of desired video insight may be an insight related to an emotion, a persuasion strategy, or a topic. In such cases, the set of classes are classes associated with emotion, persuasion strategy, and/or topic. In some cases, the second model prompt includes a temperature to indicate an extent of creativity. Such a temperature for the second model prompt may be less than a temperature associated with the first model prompt. At block 808, the one or more video insights are provided for display or for use in analyzing the video.

Accordingly, we have described various aspects of technology directed to systems, methods, and graphical user interfaces for intelligently generating and providing video insights. It is understood that various features, sub-combinations, and modifications of the embodiments described herein are of utility and may be employed in other embodiments without reference to other features or sub-combinations. Moreover, the order and sequences of steps shown in the example methods 600, 700, and 800 are not meant to limit the scope of the present disclosure in any way, and in fact, the steps may occur in a variety of different sequences within embodiments hereof. Such variations and combinations thereof are also contemplated to be within the scope of embodiments of this disclosure.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 9:
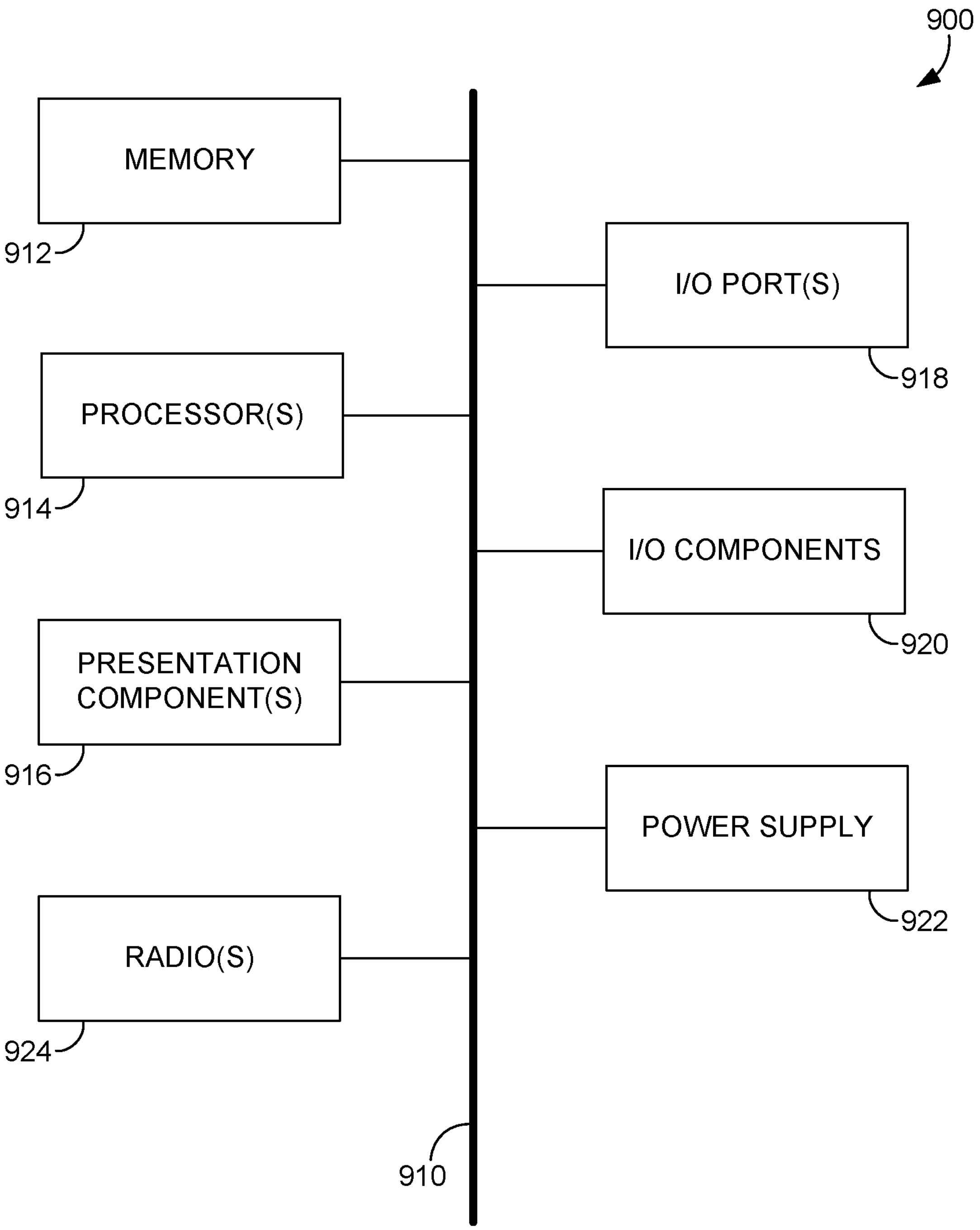
FIG. 9 is a block diagram of an exemplary computing environment suitable for use in implementing aspects of the technology described herein.

Referring to the drawings in general, and to FIG. 9 in particular, an exemplary operating environment for implementing aspects of the technology described herein is shown and designated generally as computing device 900. Computing device 900 is just one example of a suitable computing environment and is not intended to suggest any limitation as to the scope of use or functionality of the technology described herein. Neither should the computing device 900 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 9, computing device 900 includes a bus 910 that directly or indirectly couples the following devices: memory 912, one or more processors 914, one or more presentation components 916, input/output (I/O) ports 918, I/O components 920, an illustrative power supply 922, and a radio(s) 924. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 9 is merely illustrative of an exemplary computing device that can be used in connection with one or more aspects of the technology described herein. Distinction is not made between such categories as "workstation," "server," "laptop," and "handheld device," as all are contemplated within the scope of FIG. 9 and refer to "computer" or "computing device."

Computing device 900 typically includes a variety of computer-readable media. Computer-readable media can be any available media that can be accessed by computing device 900 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 912 includes computer storage media in the form of volatile and/or nonvolatile memory. The memory 912 may be removable, non-removable, or a combination thereof. Exemplary memory includes solid-state memory, hard drives, and optical-disc drives. Computing device 900 includes one or more processors 914 that read data from various entities such as bus 910, memory 912, or I/O components 920. Presentation component(s) 916 present data indications to a user or other device. Exemplary presentation components 916 include a display device, speaker, printing component, and vibrating component. I/O port(s) 918 allow computing device 900 to be logically coupled to other devices including I/O components 920, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 914 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 900. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

A computing device may include radio(s) 924. The radio 924 transmits and receives radio communications. The computing device may be a wireless terminal adapted to receive communications and media over various wireless networks. Computing device 800 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive.

What is claimed is:

1. A computing system comprising:

a processor; and computer storage memory having computer-executable instructions stored thereon which, when executed by the processor, configure the computing system to perform operations comprising:

obtain text data associated with a video, the text data including a first type of text comprising a transcription associated with the video, a second type of text comprising a metadata associated with the video, and a third type of text based on analysis of a frame of the video;

generate a first model prompt to be input into a large language model, the model prompt including the text data associated with the video;

obtain, as output from the large language model, a text representation that represents the video in natural language based on the text data including the first type of text, the second type of text, and the third type of text; and generate a second model prompt, including the text representation and an indication of a type of desired video insight, to be input into a machine learning model to generate the desired video insight that indicates context of the video.

2. The computing system of claim 1, wherein the second model prompt includes a set of classes associated with an insight related to an emotion, a persuasion strategy, or a topic.

3. The computing system of claim 1, wherein the text data further includes a video description, a video caption, and/or a video object.

4. The computing system of claim 3, wherein the video description, the video caption, and the video object are identified in association with keyframes extracted from the video.

5. The computing system of claim 4, wherein the video caption and the video object are identified using an optical flow-based approach or a sampling-based approach.

6. The computing system of claim 1, wherein the first model prompt is generated by concatenating the first type of text, the second type of text, and the third type of text.

7. The computing system of claim 1, wherein the machine learning model that generates the desired video insight comprises a classifier to identify an emotion class, a persuasion strategy class, or a topic class.

8. The computing system of claim 1, wherein the machine learning model that generates the desired video insight comprises a generator to generate an action or a reason associated with the video.

9. The computing system of claim 1, wherein the machine learning model that generates the desired video insight comprises the large language model to generate an emotion, a persuasion strategy, a topic, an action, and/or a reason associated with the video.

10. The computing system of claim 1 further comprising providing the desired video insight for display in association with the video, for analysis of the video, or for a tag of the video.

* * * * *